US008956004B2

(12) United States Patent
Todd

(10) Patent No.: US 8,956,004 B2
(45) Date of Patent: Feb. 17, 2015

(54) RECONFIGURABLE MODULAR LIGHTING SYSTEM

(75) Inventor: Eric Todd, Old Tappan, NJ (US)

(73) Assignee: BML Productions, Inc., Secaucus, NJ (US)

( * ) Notice: Subject to any disclaimer, the term of this patent is extended or adjusted under 35 U.S.C. 154(b) by 372 days.

(21) Appl. No.: 13/502,217

(22) PCT Filed: Oct. 14, 2010

(86) PCT No.: PCT/US2010/052579

§ 371 (c)(1),
(2), (4) Date: Apr. 16, 2012

(87) PCT Pub. No.: WO2011/047104

PCT Pub. Date: Apr. 21, 2011

(65) Prior Publication Data

US 2012/0201021 A1 Aug. 9, 2012

Related U.S. Application Data

(60) Provisional application No. 61/252,277, filed on Oct. 16, 2009.

(51) Int. Cl.
*G06K 9/64* (2006.01)
*F21V 21/005* (2006.01)
(Continued)

(52) U.S. Cl.
CPC ............... *F21V 21/005* (2013.01); *F21S 2/005* (2013.01); *F21S 4/008* (2013.01); *F21V 15/01* (2013.01); *F21V 21/06* (2013.01); *F21V 23/001* (2013.01);

(Continued)

(58) Field of Classification Search
USPC .......... 362/224, 225, 217.02, 217.12, 217.13, 362/217.14, 217.16, 217.17, 555, 566, 577, 362/652, 653, 457
See application file for complete search history.

(56) References Cited

U.S. PATENT DOCUMENTS 3,840,842 A * 10/1974 Gabryelewicz .............. 439/639
6,812,111 B2 * 11/2004 Cheong et al. ............... 438/396

(Continued)

FOREIGN PATENT DOCUMENTS

WO 2006044859 A2 4/2006
WO 2008012702 A1 1/2008

OTHER PUBLICATIONS

International Search Report, International (PCT) Application No. PCT/US2010/052579 (mailed Dec. 9, 2010).

*Primary Examiner* — John A Ward
(74) *Attorney, Agent, or Firm* — Weitzman Law Offices, LLC

(57) ABSTRACT

A reconfigurable modular lighting assembly, including at least two tube sections, each tube section having an end cap thereon and including at least one light emitting diode light source. An interconnection unit including multiple tube section receiving locations that each physically, releasably connect one end of a first of the at least two tube sections to one end of a second of the at least two tube sections such that the tube sections are adjacent and form a positive angle between them; and provide for interchangeably electrically connecting the light sources in the tube sections to a source of electrical power. Control data paths are operatively connected to each of the light emitting diode light sources via the interconnection unit to allow for control of the light emitting diode light sources when the at least two tube sections are respectively connected to the interconnection unit at the tube section receiving locations.

26 Claims, 25 Drawing Sheets

(51) Int. Cl.

| | |
|---|---|
| ***F21S 2/00*** | (2006.01) |
| ***F21S 4/00*** | (2006.01) |
| ***F21V 15/01*** | (2006.01) |
| ***F21V 21/06*** | (2006.01) |
| ***F21V 23/00*** | (2006.01) |
| ***F21V 23/04*** | (2006.01) |
| ***F21V 23/06*** | (2006.01) |
| *F21Y 101/02* | (2006.01) |
| *F21Y 103/00* | (2006.01) |
| *F21Y 105/00* | (2006.01) |

(52) U.S. Cl.

CPC ................. *F21V 23/04* (2013.01); *F21V 23/06* (2013.01); *F21Y 2101/02* (2013.01); *F21Y 2103/003* (2013.01); *F21Y 2105/008* (2013.01)

USPC .................. 362/217.02; 362/217.17; 362/652

(56) References Cited

U.S. PATENT DOCUMENTS

| | | | | |
|---|---|---|---|---|
| 6,853,151 | B2 * | 2/2005 | Leong et al. | 315/185 R |
| 7,017,598 | B2 | 3/2006 | Nipke | |
| 7,217,023 | B2 * | 5/2007 | Iwasa et al. | 362/555 |
| 7,221,104 | B2 | 5/2007 | Lys et al. | |
| 7,322,873 | B2 * | 1/2008 | Rosen et al. | 446/91 |
| 7,762,695 | B2 * | 7/2010 | Lanczy | 362/368 |
| 8,070,314 | B2 * | 12/2011 | St. Ives et al. | 362/225 |
| 8,104,920 | B2 * | 1/2012 | Dubord | 362/217.12 |
| 8,232,724 | B2 * | 7/2012 | Mostoller et al. | 313/512 |
| 8,545,045 | B2 * | 10/2013 | Tress | 362/217.17 |
| 2002/0114155 | A1 * | 8/2002 | Katogi et al. | 362/219 |
| 2011/0051407 | A1 * | 3/2011 | St. Ives et al. | 362/225 |

* cited by examiner

RECONFIGURABLE MODULAR LIGHTING SYSTEM

CROSS REFERENCE TO RELATED APPLICATIONS

This application claims benefit of priority of U.S. Provisional Application Ser. No. 61/252,277 filed Oct. 16, 2009, the entirety of which is incorporated herein by reference.

BACKGROUND

1. Field of the Invention

This disclosure relates generally to light emitting diodes (LEDs), and, more particularly, to a structurally self-sustaining modular light emitting diode assembly.

2. Description of Related Art

Large and complex lighting systems may be used to create interesting lighting shapes in freestanding, wall-mounted or suspended configurations. However, lighting possibilities have been hindered by the logistics and delicacy of conventional lighting solutions. Additionally, the construction of such systems is complicated by the logistics for the supply of electrical power, transmission of data between lighting fixtures and associated controllers, and structural support. Associated wiring between light fixtures is time consuming and hard to conceal.

Accordingly, sacrifices must be made with respect to the aesthetic design of conventional lighting systems. The difficulty in concealing the wiring associated with conventional lighting systems adversely affects the visible results obtainable with such systems. Additionally, conventional lighting systems do not provide the capability to create structures or geometric interconnected shapes.

BRIEF SUMMARY

In one aspect of this disclosure, a modular light emitting diode assembly system is disclosed in which substantially all visible wiring between lighting elements is eliminated. The system includes a tubular light-diffusing assembly and an intermediate electrical connector. Multiple tubular light diffusing assemblies may be physically connected to form a structure or desired geometric shape of interconnected tubular light diffusing assemblies. Electrical power and/or data is distributed between the tubular light diffusing assemblies via the intermediate electrical connectors and structural support for the assembly is provided by interconnection of the individual tubular light diffusing assemblies.

In another aspect of this disclosure, a modular light emitting diode assembly system includes first and second tubular light diffusing assemblies. Each light diffusing assembly includes a tube section having at least one internally mounted light emitting diode, an electrical connector electrically connected to the at least one internally mounted light emitting diode, and an end cap mounted on an end of the tube section, the end cap including a port for receiving the electrical connector. An intermediate connector is releasably connected to the end cap to connect the first tubular light diffusing assembly to the second tubular light diffusing assembly. The intermediate connector includes a first electrical connector that releasably engages the electrical connector in the first tubular light diffusing assembly and a second electrical connector that releasably engages the electrical connector in the second tubular light diffusing assembly to electrically connect the light emitting diode in the first tubular light diffusing assembly to the light emitting diode in the second light diffusing assembly.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This application discloses a modular lighting system that utilizes light emitting diodes (LEDs). A LED is a semiconductor diode that efficiently converts electrical energy into electromagnetic radiation at visible wavelengths by electroluminescence. Examples of known LEDs include inorganic LEDs, organic LEDs (both polymer (PLEDs) and flexible (FLEDs)), as well as phosphor-based LEDs and quantum dot LEDs. In general, LEDs are very durable and have very long lives, making them an ideal solution for a modular self-supporting lighting system with integrated electrical connections. The modular LED assembly utilizes a selection of components to create a system of interlocking components that may be combined to form a wide variety of desired shapes and configurations. Additionally, the components are designed so as to be structurally and electrically self sufficient, so that no external support or additional electrical coupling is required. Moreover, the modular LED assembly disclosed herein eliminates substantially all visible wiring between lighting elements.

Figure 1:
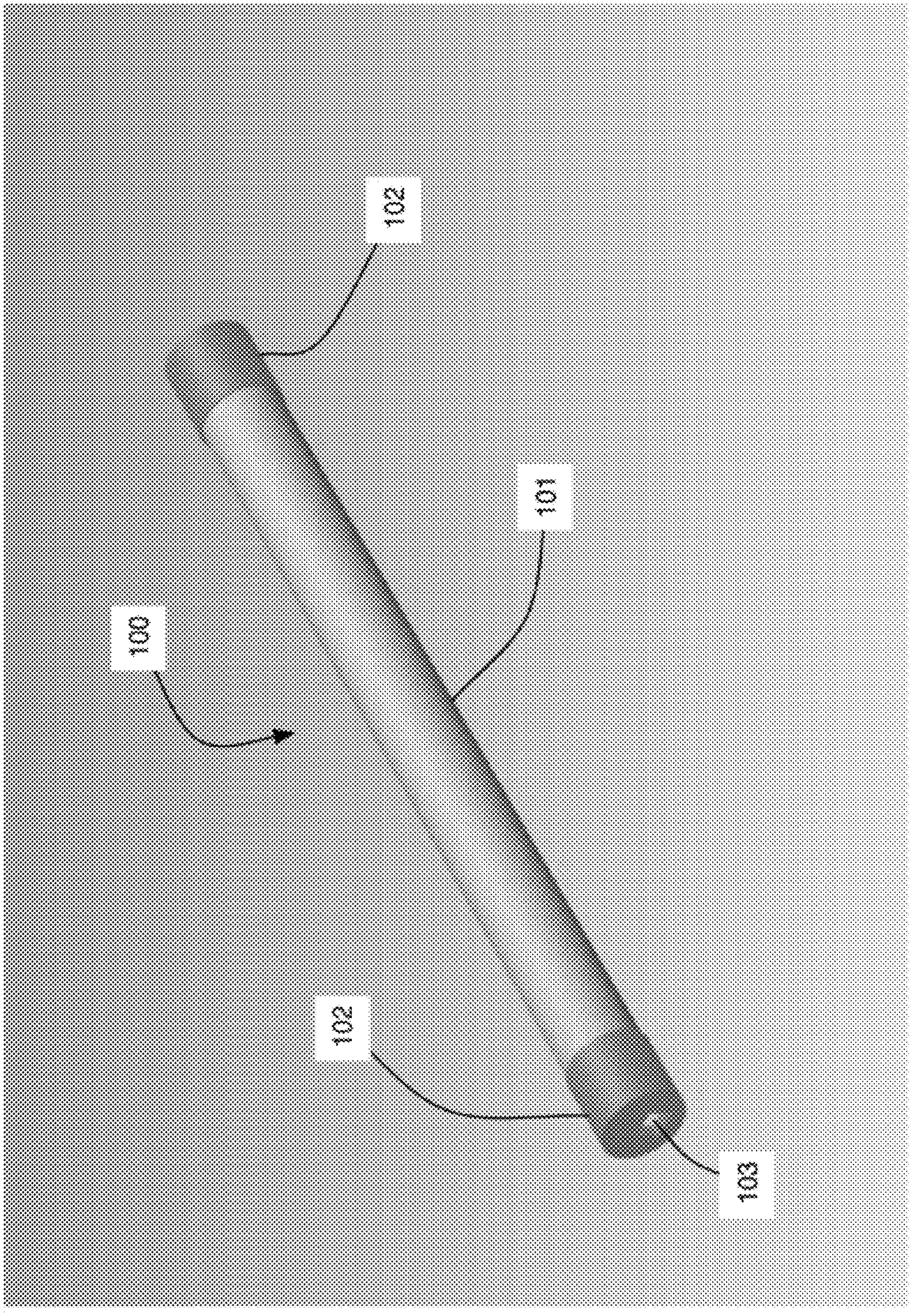
FIG. 1 is a perspective view of an illustrative tubular light diffusing assembly with an illustrative example end cap installed on each end of the assembly.

FIG. 1 illustrates an exemplary assembled LED tubular light diffusing assembly 100. Tubular light diffusing assembly 100 includes of a tube section 101 for diffusing light emitted by one or more internally mounted LEDs. The tube section 101 may be baffled (or otherwise textured) to better diffuse light across the tube. An end cap 102 is positioned on each end of the tube section 101. End caps 102 preferably have electrical port openings 103 for receiving an electrical plug connection. In the preferred embodiment, electrical port openings 103 are designed as female openings for receiving a male electrical plug connection.

Figure 1A:
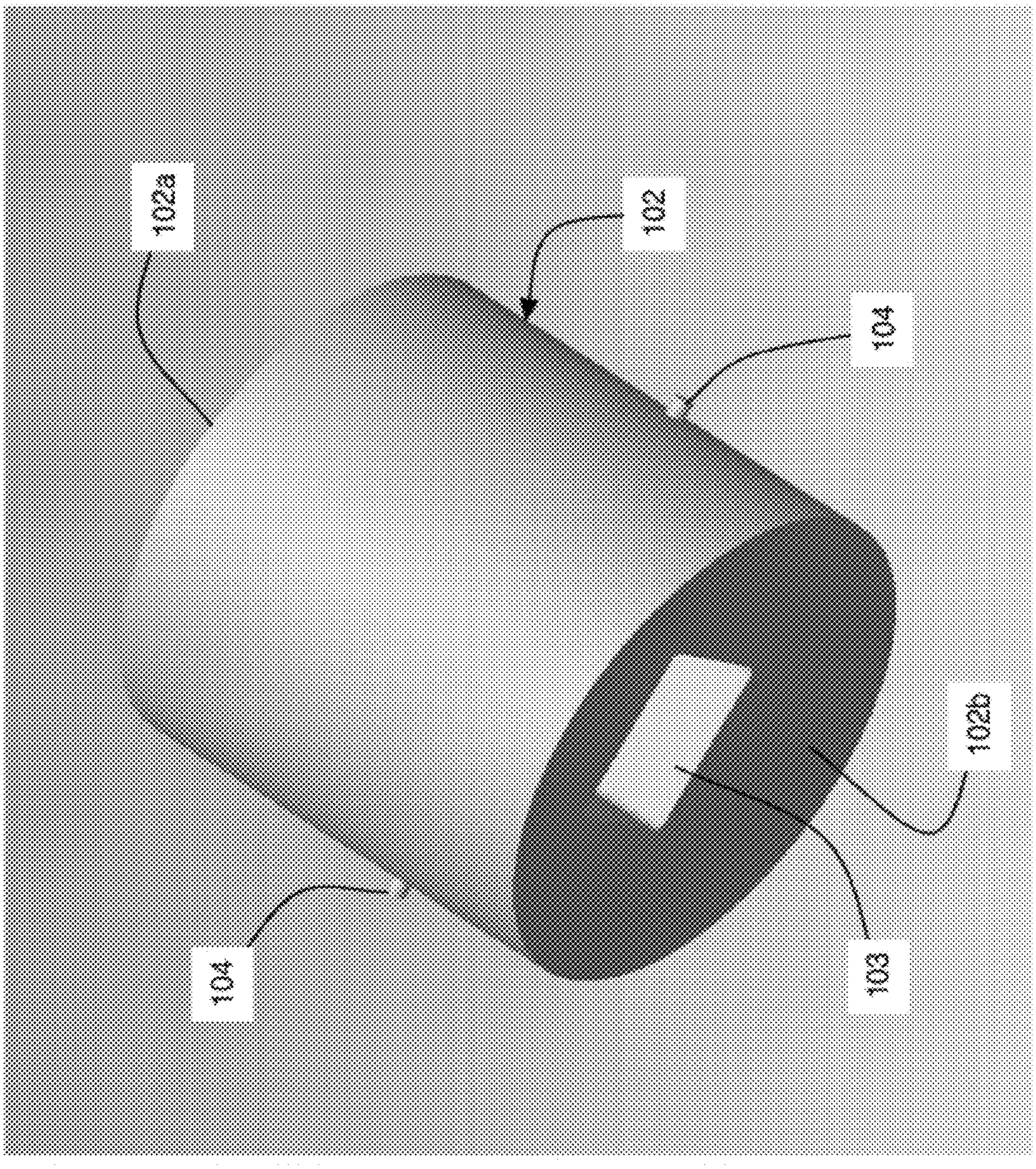
FIG. 1A is a perspective view of the end cap of FIG. 1.

FIG. 1A illustrates the end cap 102, which is generally cylindrical with an open end 102*a* and a closed end 102*b*. As mentioned above, end cap 102 preferably has an electrical port opening 103 in its closed end 102*b* for receiving an electrical plug connection. End cap 102 may also have protrusions 104*a*, 104*b*, which releasably lock end cap 102 (and the tubular light diffusing assembly 100 in turn) to a locking ring (described later below).

Figure 1B:
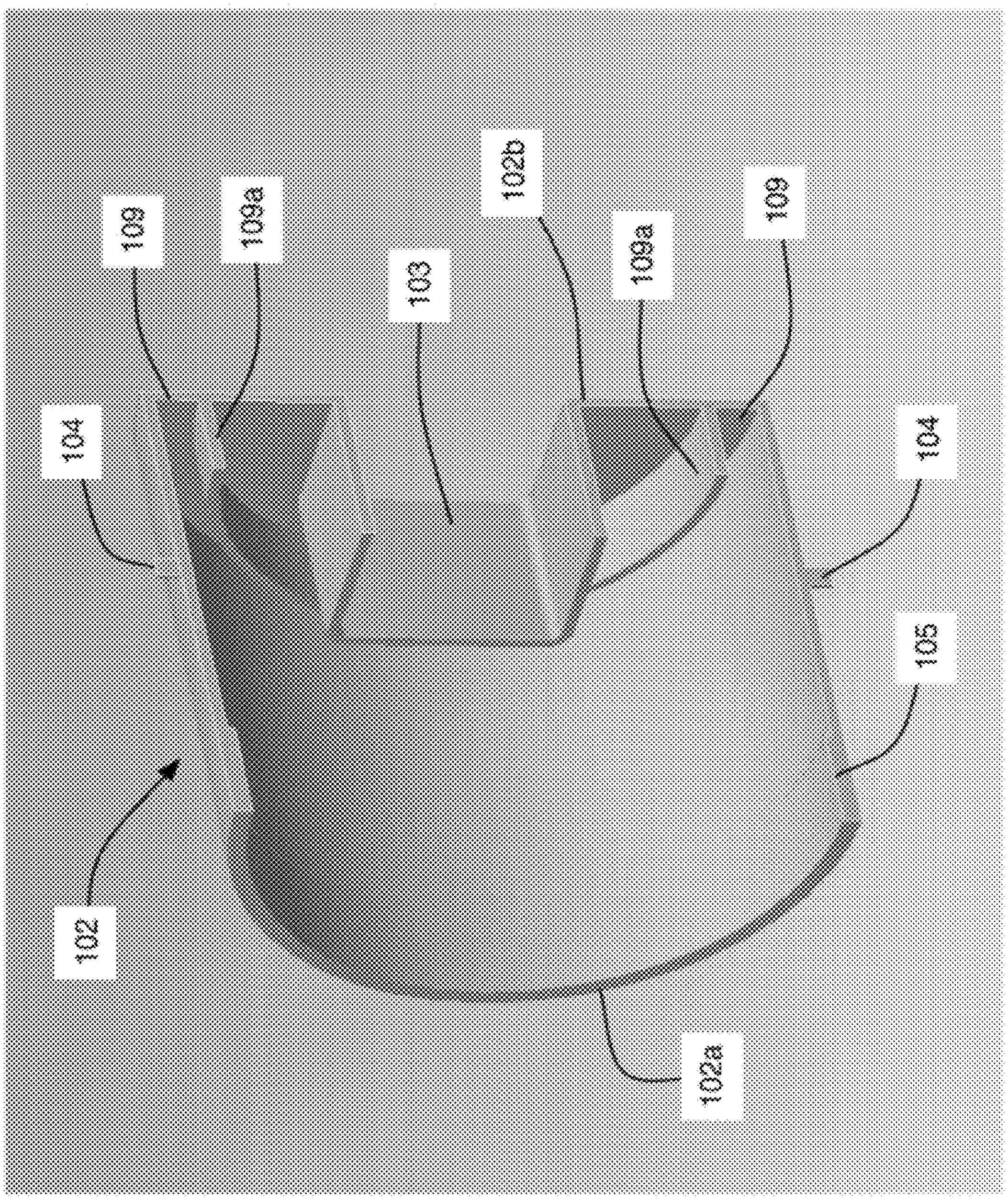
FIG. 1B is a cross section view of the end cap of FIG. 1A.

FIG. 1B is a cross section view of end cap 102, which illustrates locking tab 105. Locking tab 105 may be an internally projecting circumferential surface or flange of end cap 102, which acts as an interlocking component with a raised, externally projecting circumferential surface or flange of tube section 101. Locking tab 105 is preferably includes a seat 109 defined by an inwardly projecting, circular wall 109*a* formed on the interior side of the closed end 102*b* to facilitate securing the end cap 102 to tube section 101. Alternatively, a clip, pin, fastener or the like (not shown) may be used to connect the end cap 102 to the tube section 101. The seat 109 receives an end of the tube section 101.

Figure 1C:
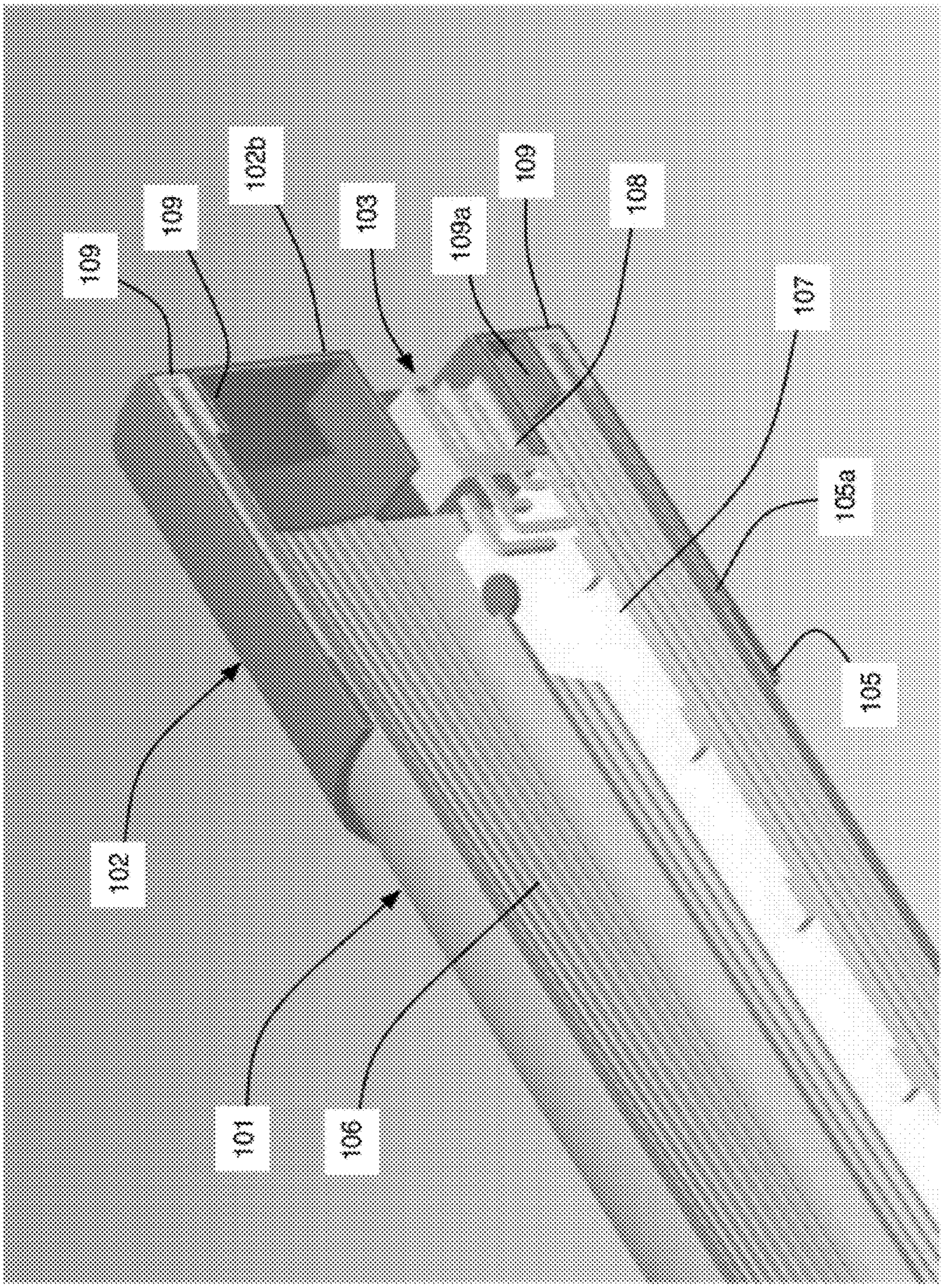
FIG. 1C is a cross section view of the end cap installed on one end of the illustrative tubular light diffusing assembly of FIG. 1.

FIG. 1C is a cross section view of an end cap 102 installed on an end of tube section 101. As mentioned above, tube section 101 may include texturing 106 to evenly diffuse light across the tube. Texturing 106 may be baffling, fluting or any other pattern suitable for light diffusion. Texturing 106 may be, for example, internal (as shown), external or built into the physical structure of tube section 101.

Tube section 101 preferably includes a raised, outwardly projecting circumferential surface 105*a*, which interlocks with the raised, internally projecting circumferential surface 105 of the end cap 102 to mount the end cap on the end of the tube section.

Electrical connector 108 is provided to supply electrical continuity to the LED mounting rail 107. LED mounting rail 107 preferably physically supports at least one LED light, and contains electrical pathways to provide all mounted LEDs with power and/or data. LED mounting rail 107 may also include bypass electrical pathways so that electrical continuity is not interrupted across the tubular light diffusing assembly, or to other LEDs in the event of single or multiple LED failure. Electrical connector 108 is preferably received within the end cap electrical port opening 103. The electrical connector 108 is preferably recessed with the opening 103 so that the connector is not flush with the closed end 102.

Figure 2:
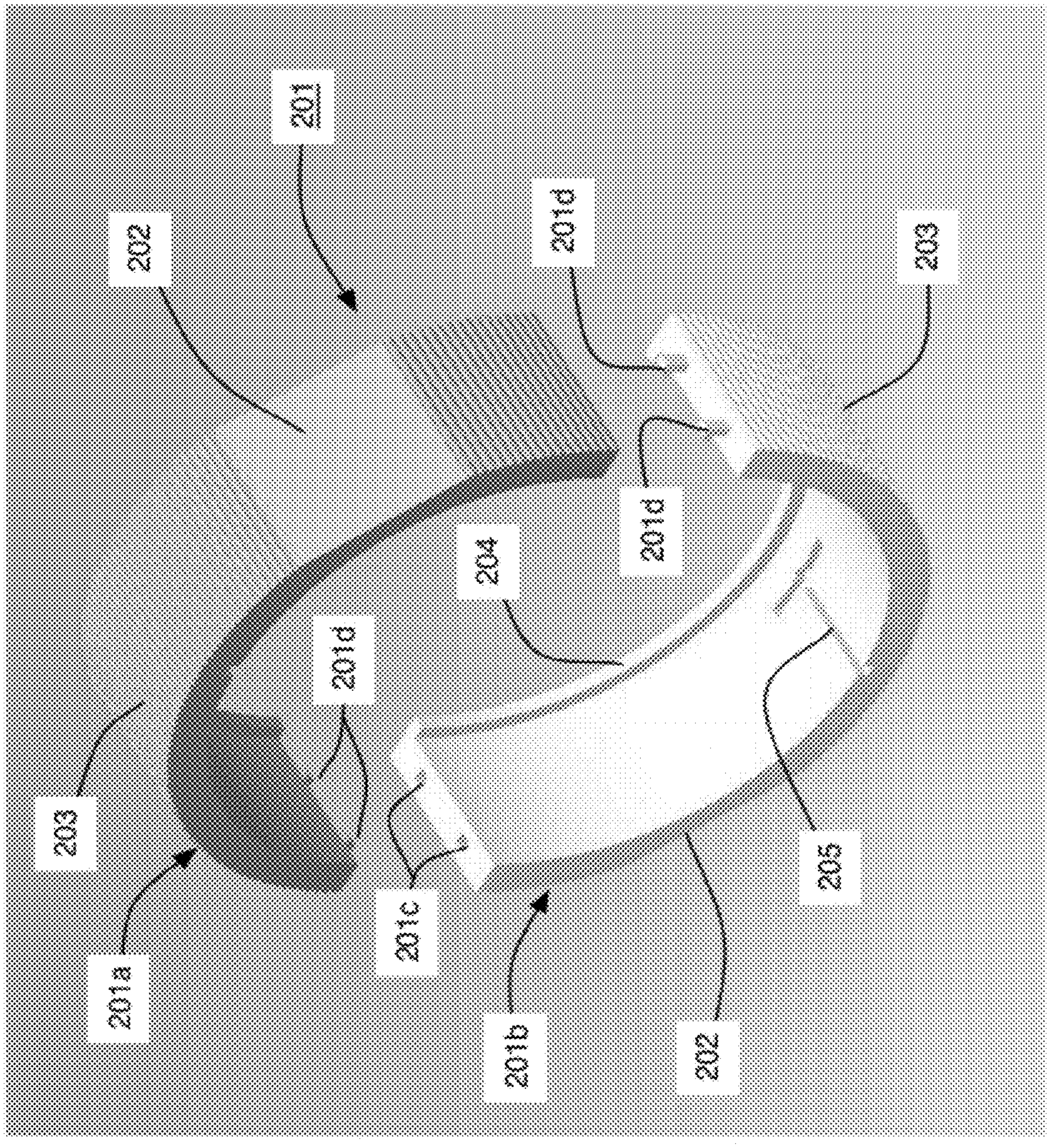
FIG. 2 is an exploded perspective view of an example locking ring for a modular LED assembly.

FIG. 2 illustrates a section of a locking ring 201 for a modular LED assembly. Locking ring 201 may be formed from two sections 201*a* and 201*b*. The sections 201*a*, 201*b* may be joined together by inserting pins 201*d* projecting from one section into corresponding indents or openings 201*c* formed in the other section. The surface of locking ring 201 is preferably part textured and part flat for easy manual handling. Texturing 203 provides a gripping surface for handling of the locking ring 201. One or more flat regions 202 are preferably provided between textured regions 203 to provide alternative regions of grip, or the ability to use a tool (e.g., a wrench) to rotate or otherwise turn the locking ring 201.

Locking ring 201 also preferably includes an inwardly projecting circumferential flange 204 on its inner edge for releasably engaging a corresponding indent or recess on another component of the modular LED assembly. Locking ring 201 may also include a T-shaped or L-shaped groove 205 on its inner surface for receiving another component of the modular LED assembly. Groove 205 is preferably defined by a narrow channel that extends from an edge of locking ring 201 and terminates in a perpendicular channel set parallel to the edge of the locking ring. For example, protrusions 104 on end cap 102 (from FIG. 1A) may slide into a respective groove 205 of locking ring 201 and then twist to releasably lock tubular light diffusing assembly 100 (with attached end caps 102) to the locking ring.

Figure 3:
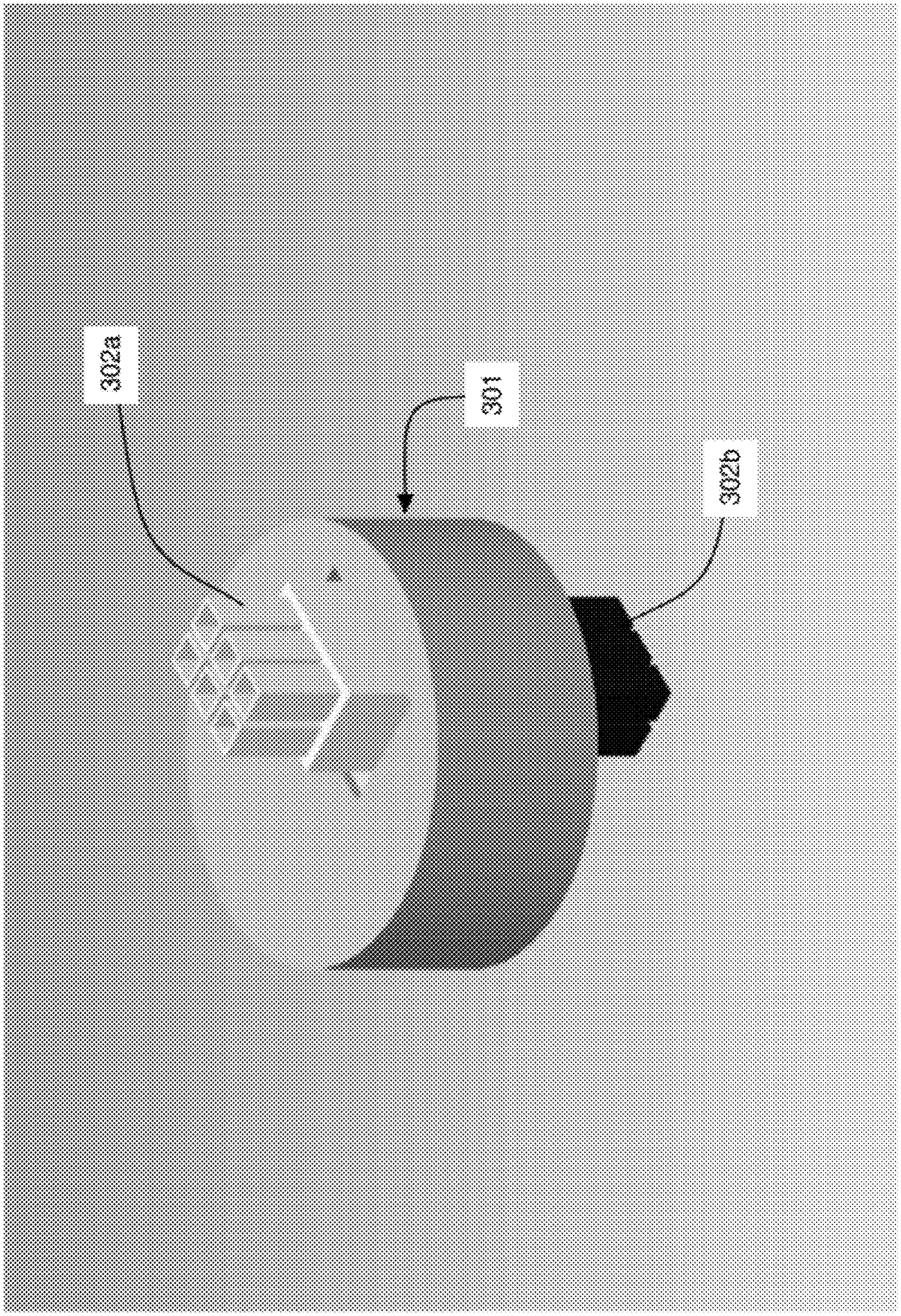
FIG. 3 is a perspective view of an example intermediate connector for a modular LED assembly.
Figure 3A:
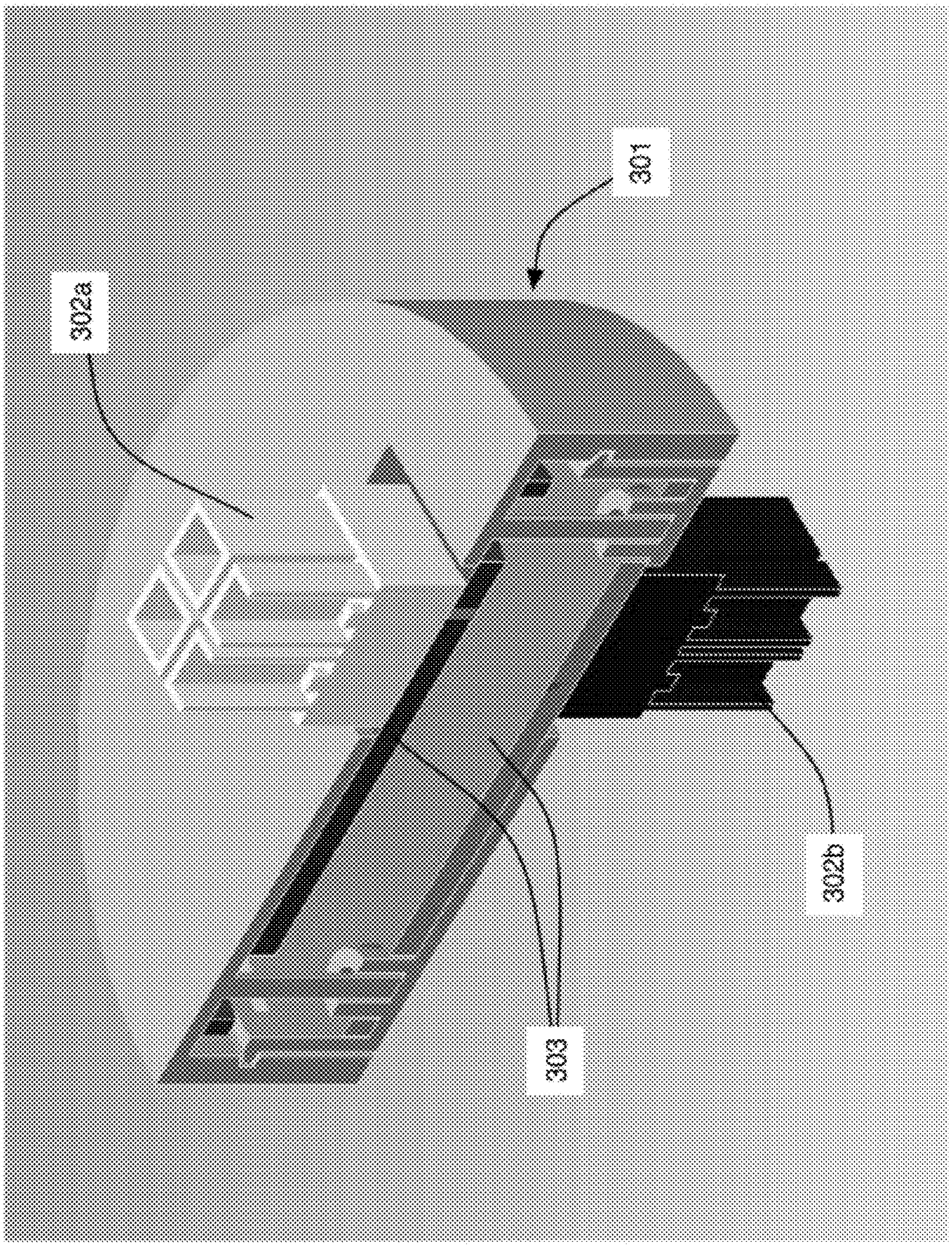
FIG. 3A is a cross section view of the intermediate connector of FIG. 3.
Figure 3B:
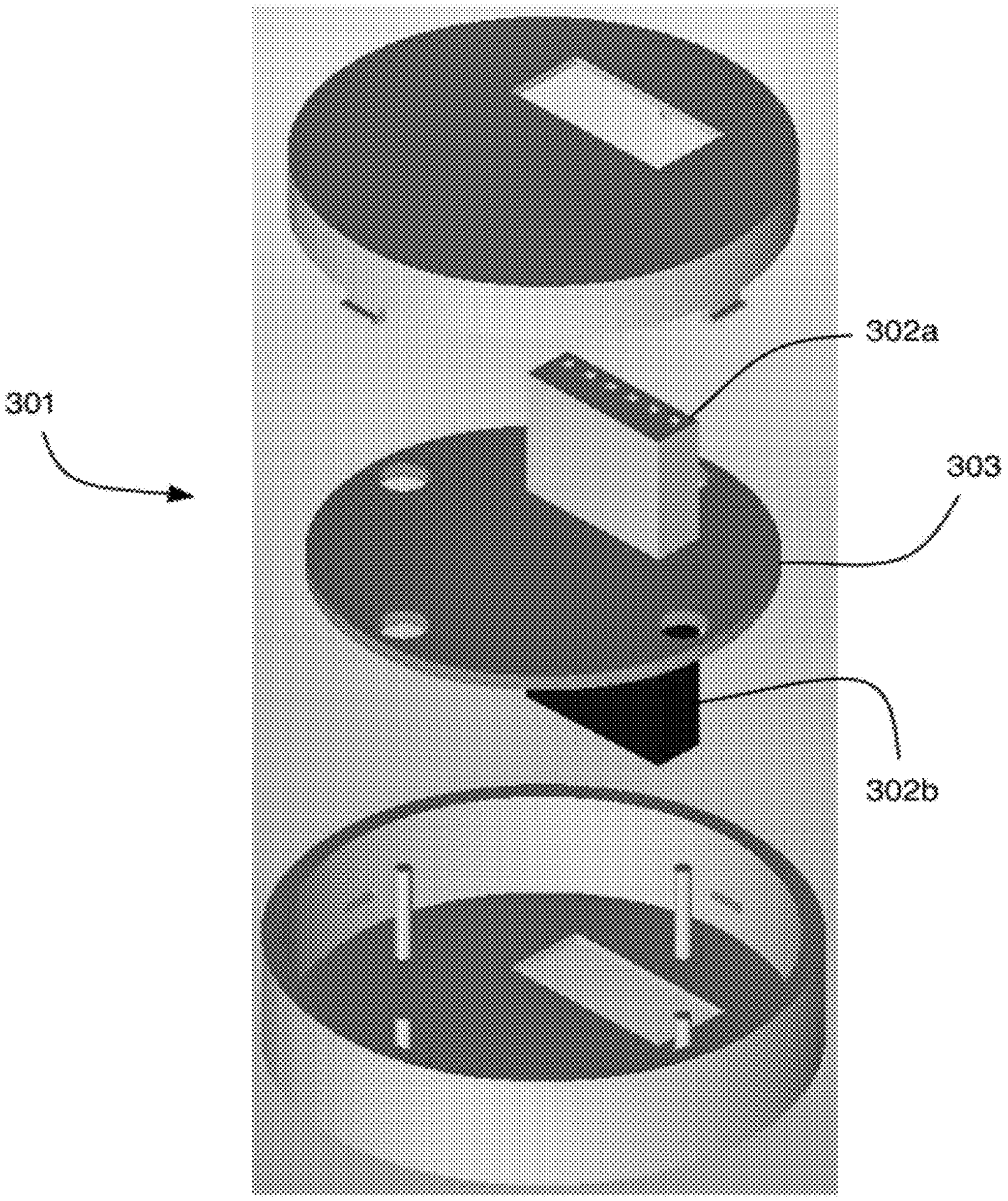
FIG. 3B is an exploded view of the intermediate connector of FIG. 3.

FIGS. 3, 3A and 3B illustrate an intermediate connector 301 for a modular LED assembly. Intermediate connector 301 preferably includes a cylindrically shaped housing having at least two protruding male electrical connectors 302*a*, 302*b* protruding from opposing sides of the intermediate connector 301. Electrical connectors 302*a*, 302*b* are preferably electrically coupled via internal electrical junction 303. Internal electrical junction 303 may be wiring, circuitry, or any other suitable connection for communicating electrical power and/or data between connectors 302*a*, 302*b*.

Intermediate connector 301 preferably facilitates the electrical connection between two components of the modular LED assembly by allowing standardization of all electrical connectors of the other components of the modular LED assembly. For instance, if one wished to connect two tubular light diffusing assemblies, each assembly would need a male and female electrical port. This would limit the permutations in which one could assemble the modular LED assembly. By utilizing the intermediate connector 301, the electrical ports or connectors on tubular light diffusing assemblies may be standardized (e.g., all female connectors). This would then allow other components of the modular LED assembly to be arranged in any configuration desired.

Figure 4:
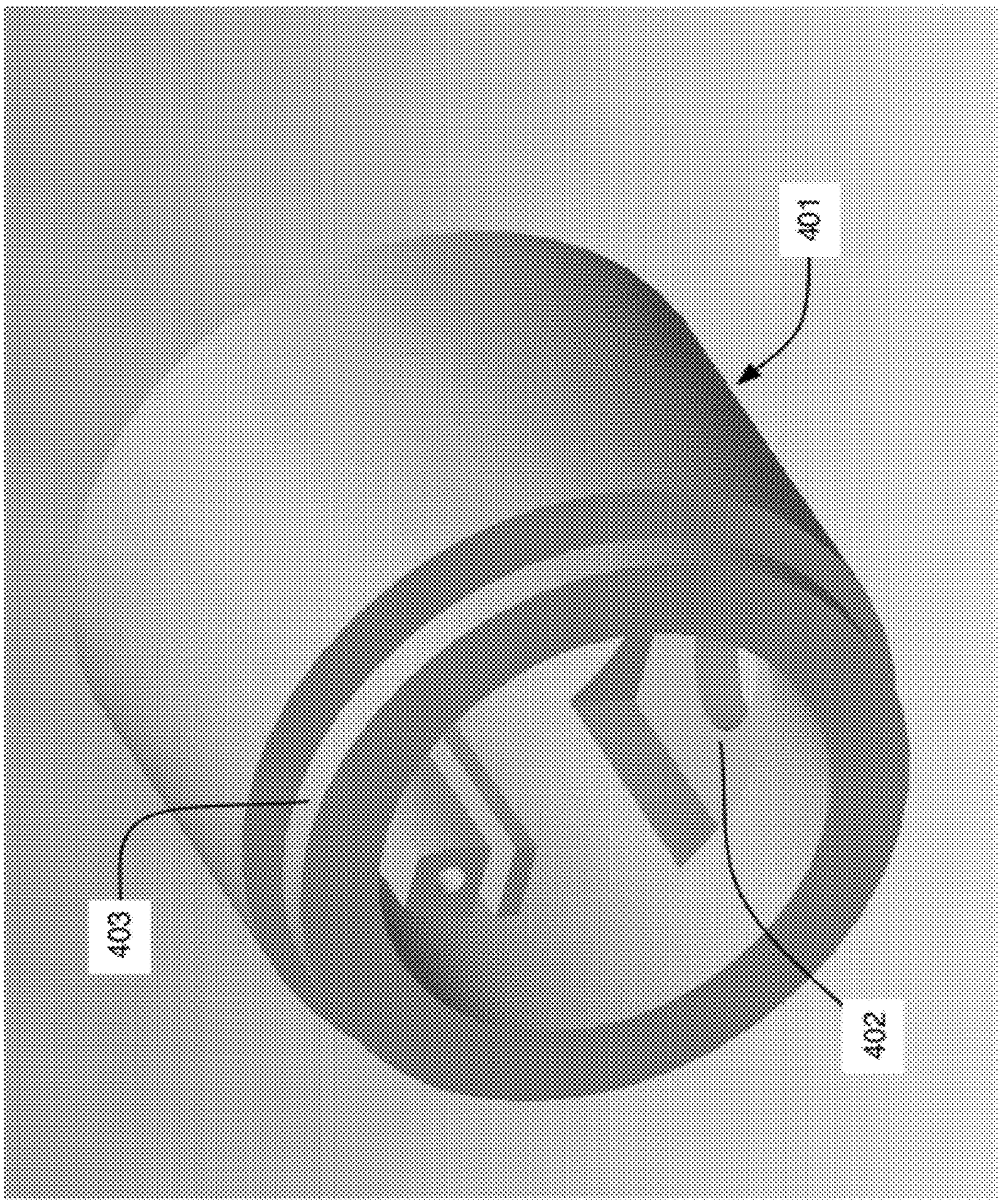
FIG. 4 is a perspective view of an example power supply for a modular LED assembly.

FIG. 4 illustrates an illustrative conical power supply connector 401 for a modular LED assembly. Conical power supply connector 401 preferably provides the ability to supply electric current and data to the modular LED assembly. An electrical port 402 may provide electrical power and/or data to the conical power supply 401. The illustrative conical power supply connector 401 may include a raised edge with an external circumferential flange or groove 403. The circumferential flange or groove 403 may releasably engage the internally projecting circumferential flange 204 of the locking ring 201 (from FIG. 2), or an internal circumferential groove (as described above).

Figure 4A:
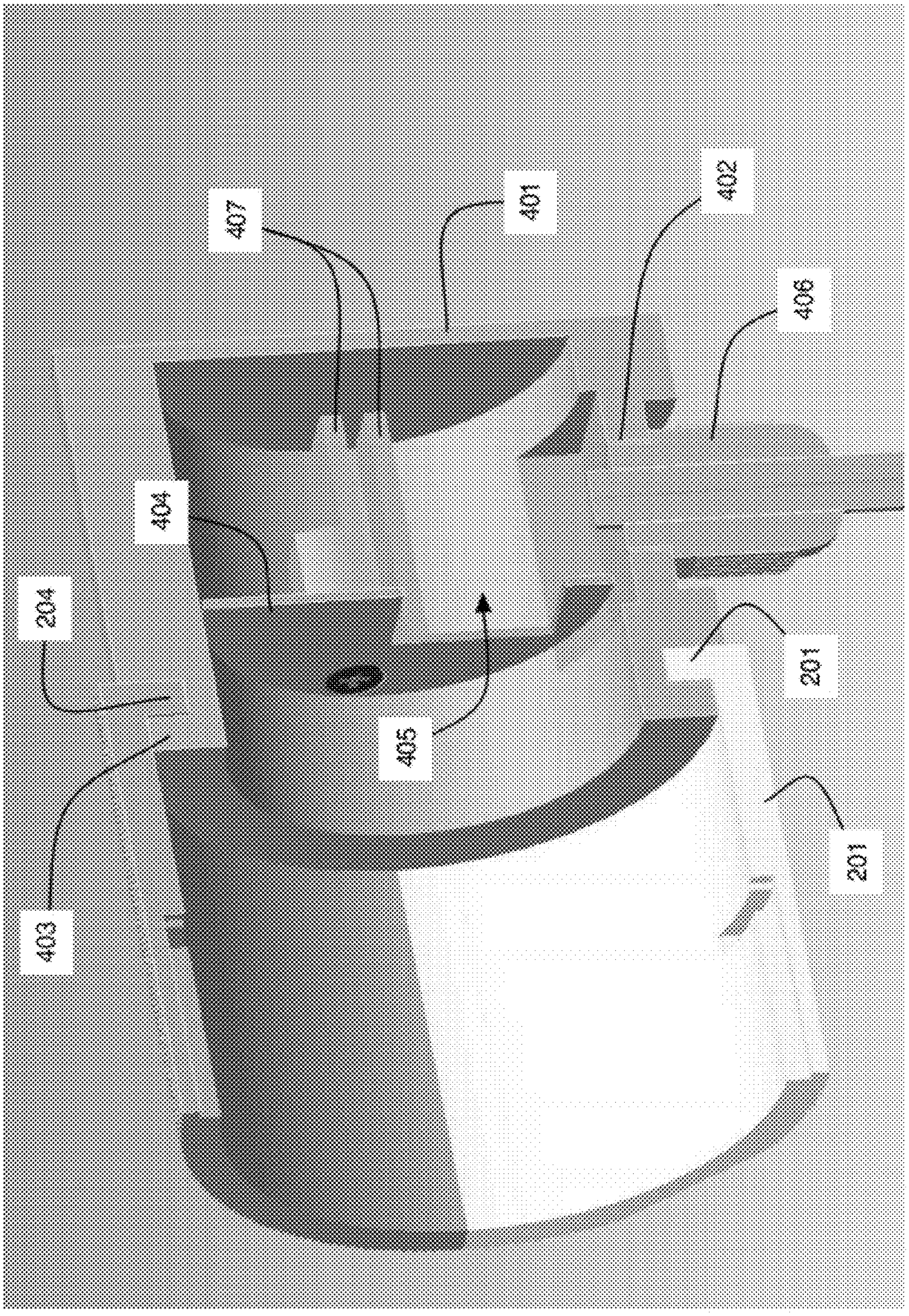
FIG. 4A is a cross sectional illustrative view of a power supply connected to a locking ring.

FIG. 4A is a cross section view of the conical power supply connector 401 for a modular LED assembly. Conical power supply connector 401 is preferably adapted to receive an external power connector 406 through connector port 402. External power connector 406 may be fastened to the body of conical power supply connector 401 in a conventional manner, such as (but not limited to) using indent tabs, friction of the plug body, magnets, etc. Conical power supply connector 401 may also receive electric power and/or data through another component of the modular LED assembly, in which case it may act as a central hub, rather than a power supply. As an alternative, conical power supply connector 401 may also include symmetrical top and bottom ends (preferably formed from two interlocking sections) to allow for two connections to other components of the modular LED assembly. An electrical port opening 405 may be provided in top cover plate 404 for mounting an electrical connector (not shown), which is preferably electrically connected to the external power connector 406.

A locking mechanism may also be provided to secure conical power supply connector 401 to a locking ring 201 (from FIG. 2), and subsequently, for instance, to a tubular light diffusing assembly 100. Longitudinally extending members 407 may project from the interior surface of the conical power supply connector 401 to provide rigidity for conical power supply 401 and to support the cover plate 404. Members 407 may also provide mass with which to attach fasteners for various components (such as the top plate 404, as shown). Conical power supply connector 401 may also include other external power/data outlets (not shown), preferably aligned along the external circumferential wall to deliver electrical power and/or data to more than one device at a time.

Figure 4B:
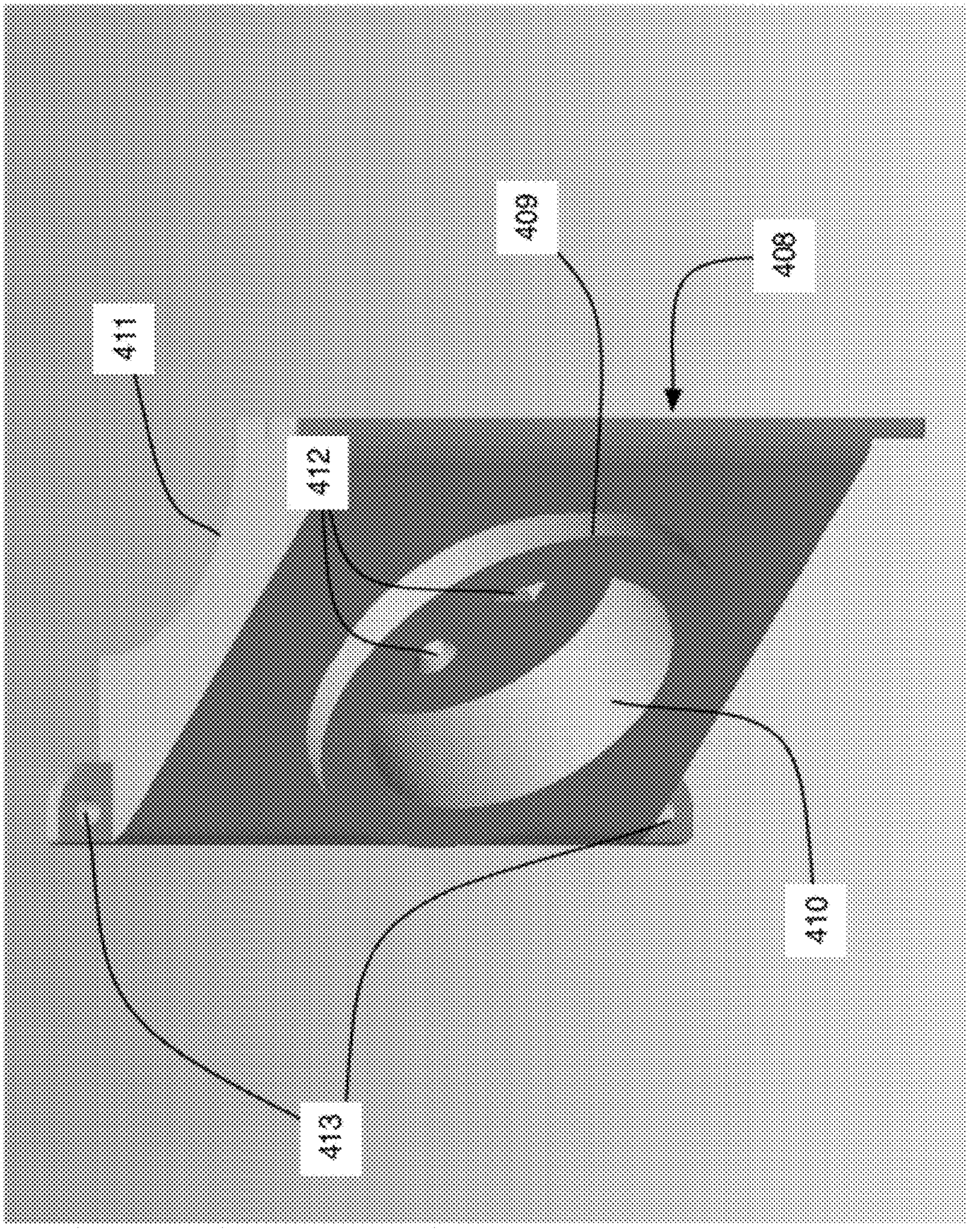
FIG. 4B is a front perspective view a power supply attachment.

FIG. 4B illustrates a power supply attachment 408. Power supply attachment 408 is adapted to provide additional mating surfaces for attaching other components of the modular LED assembly to the conical power supply (as will be described below). Power supply attachment 408 preferably includes a raised circular flange 409 that allows for fastening to a locking ring 201 (from FIG. 2). The power supply attachment 408 may also include a conical recess 410 that allows for the use of an intermediate electrical connector 301 (from FIG. 3, 3A). Openings 412 are provided at the bottom of recess 410 to provide access for electrical connection to the conical power supply connector 401 (from FIG. 4). The inside surface of power supply attachment 408 is preferably curved to match or otherwise correspond to the exterior surface of a conical power supply connector 401. Securing tabs 413 may be used to hold the assembly together, as described below.

Figure 4C:
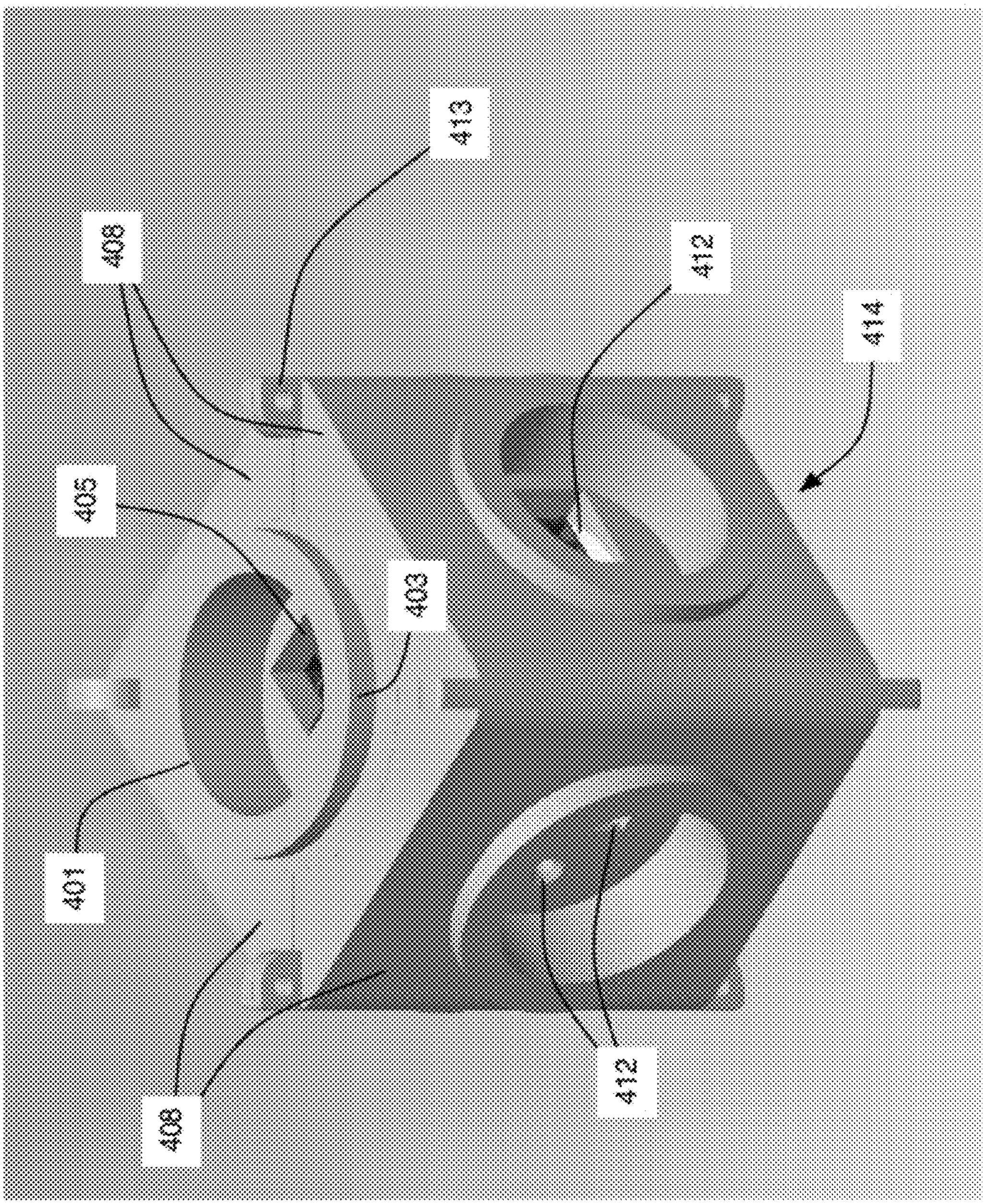
FIG. 4C is a perspective view of a power supply installed within a configuration of power supply attachments.

FIG. 4C illustrates an assembled hub 414, which includes of a central conical power supply connector 401 mounted within a configuration of power supply attachments 408. The raised flange 403 (from FIG. 4) of conical power supply connector 401 is preferably elevated above the top surface of hub 414, allowing a top connection to another component of the modular LED assembly via a locking ring 201 (from FIG. 2). Ports 412 and 405 (from FIG. 4) may be provided to enable electrical connection of modular LED assembly components to electrical power supply/data provided by hub 414. Securing tabs 413 preferably align laterally with one another when hub 414 is assembled. One may secure hub 414 by inserting a fastener (e.g., screw, nut and bolt, etc.) through the securing tabs 413. Although hub 414 is depicted as consisting of one conical power supply connector 401 and four attachments 408, it is understood that this configuration may readily be modified or adapted to allow additional connections, angles and shapes, as required by the end-user.

Figure 5:
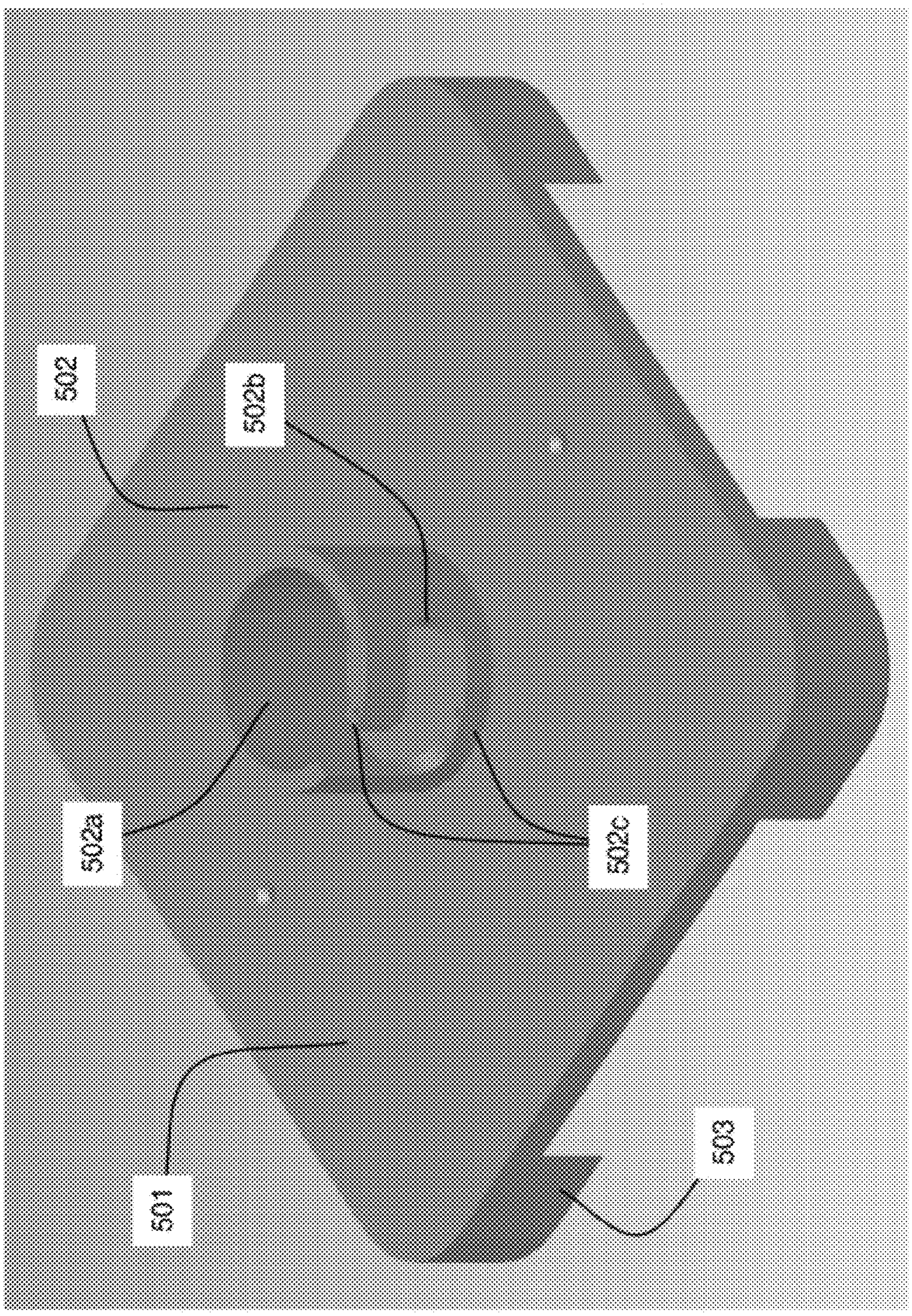
FIG. 5 is a perspective view of an example freestanding base for a modular LED assembly.

FIG. 5 illustrates a freestanding base 501 for a modular LED assembly. Freestanding base 501 is preferably supported by four legs 503, which extend downward from freestanding base 501. Freestanding base 501 preferably includes a centrally located, cylindrical fitting 502 projecting upward from the base. The fitting 502 is preferably defined by a central opening 502*a*, a locking slot 502*b*, and a pair of aligned pinholes 502*c*. Central opening 502*a* is preferably configured to receive a conical power supply connector 401 (from FIG. 4). Locking slot 502*b* is preferably L-shaped and is configured to receive an external power connector (from FIG. 4A) inserted within a conical power supply connector 401 (from FIG. 4). The conical power supply connector 401 may be inserted into the central opening 502*a* by aligning the external connector 406 with the locking slot 502*b*. Rotation of the conical power supply connector 401 caused the external connector 406 to move into the perpendicular section of the locking slot to releasably secure the conical power supply connector 401 to the freestanding base 501. A locking pin 504 may then be removably inserted with the aligned pinholes 502 to prevent rotation and subsequent removal of the power connector 401 from the base 501.

Figure 5A:
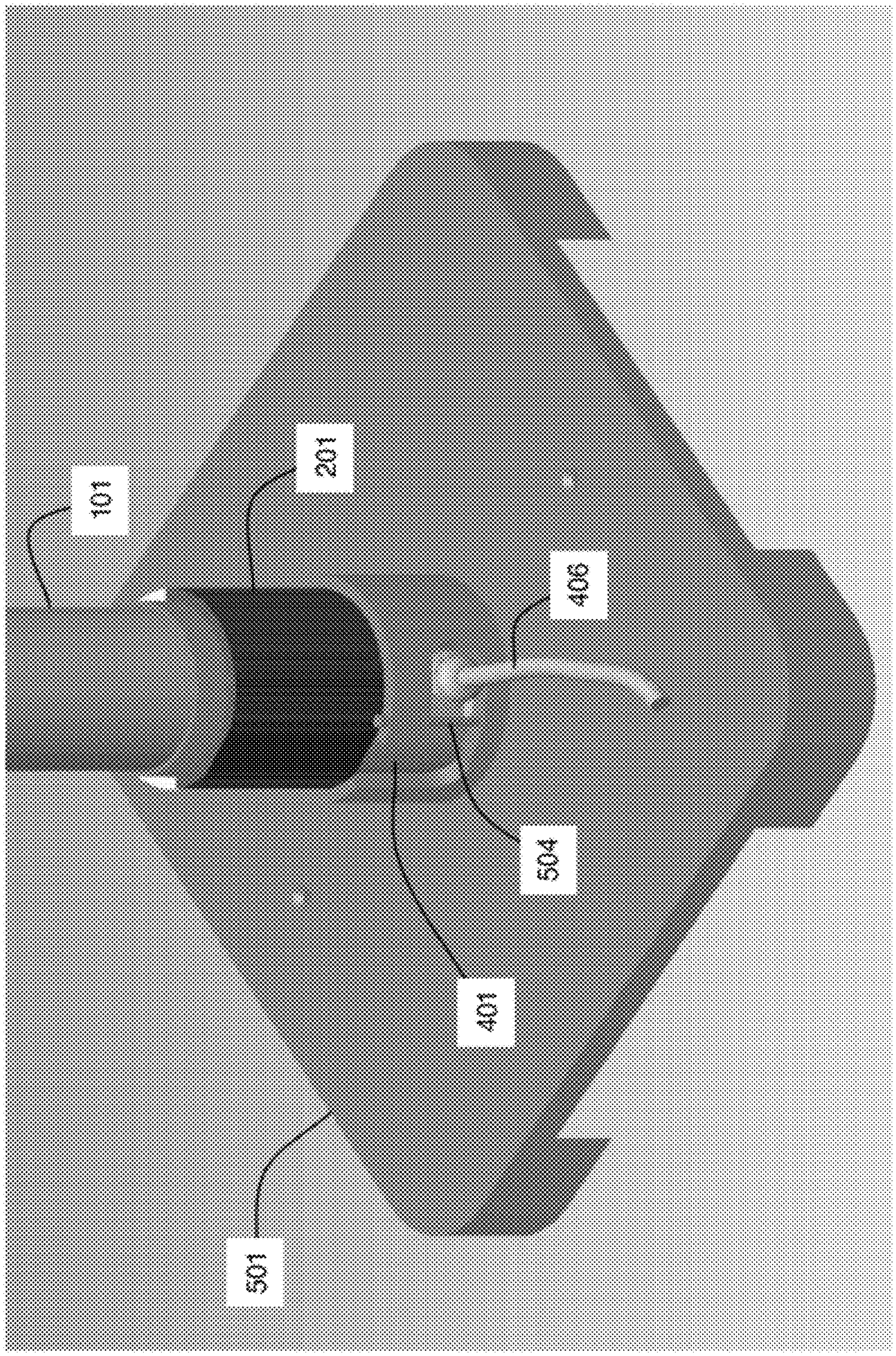
FIG. 5A is a perspective view of the freestanding base of FIG. 5 connected to a power supply, locking ring and tubular light diffusing assembly.

FIG. 5A depicts a conical power supply connector 401, locking ring 201 and tubular light diffusing assembly 101 mounted on freestanding base 501. Tubular light diffusing assembly 101 is preferably connected to conical power supply connector 401 via locking ring 201. Alternatively, a clip, pin, fastener or the like (not shown) may be used to connect the end tubular light diffusing assembly 101 to conical power supply connector 401. External power connector 406 may be plugged into or otherwise electrically connected to conical power supply connector 401 to provide the modular LED assembly with electrical power and/or data. The coupled tubular light diffusing assembly 101, locking ring 201 and conical power supply 401 are preferably inserted into the raised fitting 502 so that the electrical power connector 406 enters the vertical section of locking slot 502 (from FIG. 5). Afterwards, the coupled tubular light diffusing assembly 101, locking ring 201 and conical power supply 401 are preferably turned so that the electrical power connector 406 reaches the terminal end of the horizontal section of locking slot 502 (from FIG. 5). Locking pin 504 is then preferably inserted into pinhole 502*c* (from FIG. 5) to releasably secure the assembly to the base 501.

The end caps 102, locking ring 201, intermediate connector 301, power supply connector 401, power supply attachments 408, base 501 and other components of the modular LED assembly may be made from plastic or any other suitable material. These components may be made by injection molding or in similar manufacturing process.

Figure 6:
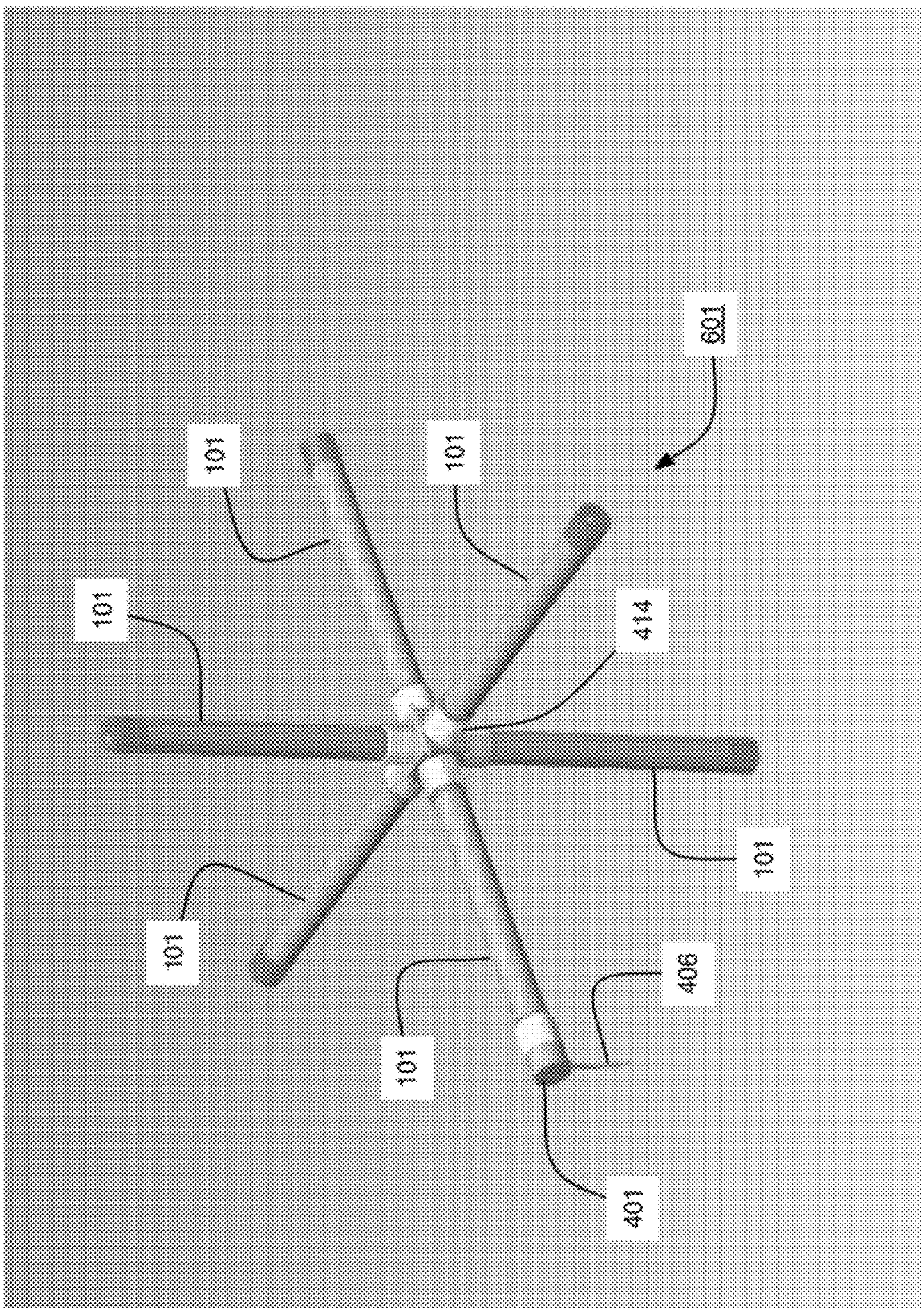
FIG. 6 is a perspective view of an illustrative assembled modular LED assembly.

An illustrative assembled modular LED assembly 601 is shown in FIG. 6. Tube sections 101 (from FIG. 1) are all connected to an assembled central hub 414 (FIG. 4C above). An additional conical power supply 401 may be attached to one of the light diffusing assemblies 101 and preferably receives power and/or data through external power connector 406. Electrical power and/or data are preferably transmitted (via the electrical pathways described above) throughout the entire modular LED assembly 601, illuminating the LEDs within each light diffusing assembly 101. In this manner, the central hub 414 preferably includes one power/data integrated connection for multiple light diffusing assemblies 101.

Figure 6A:
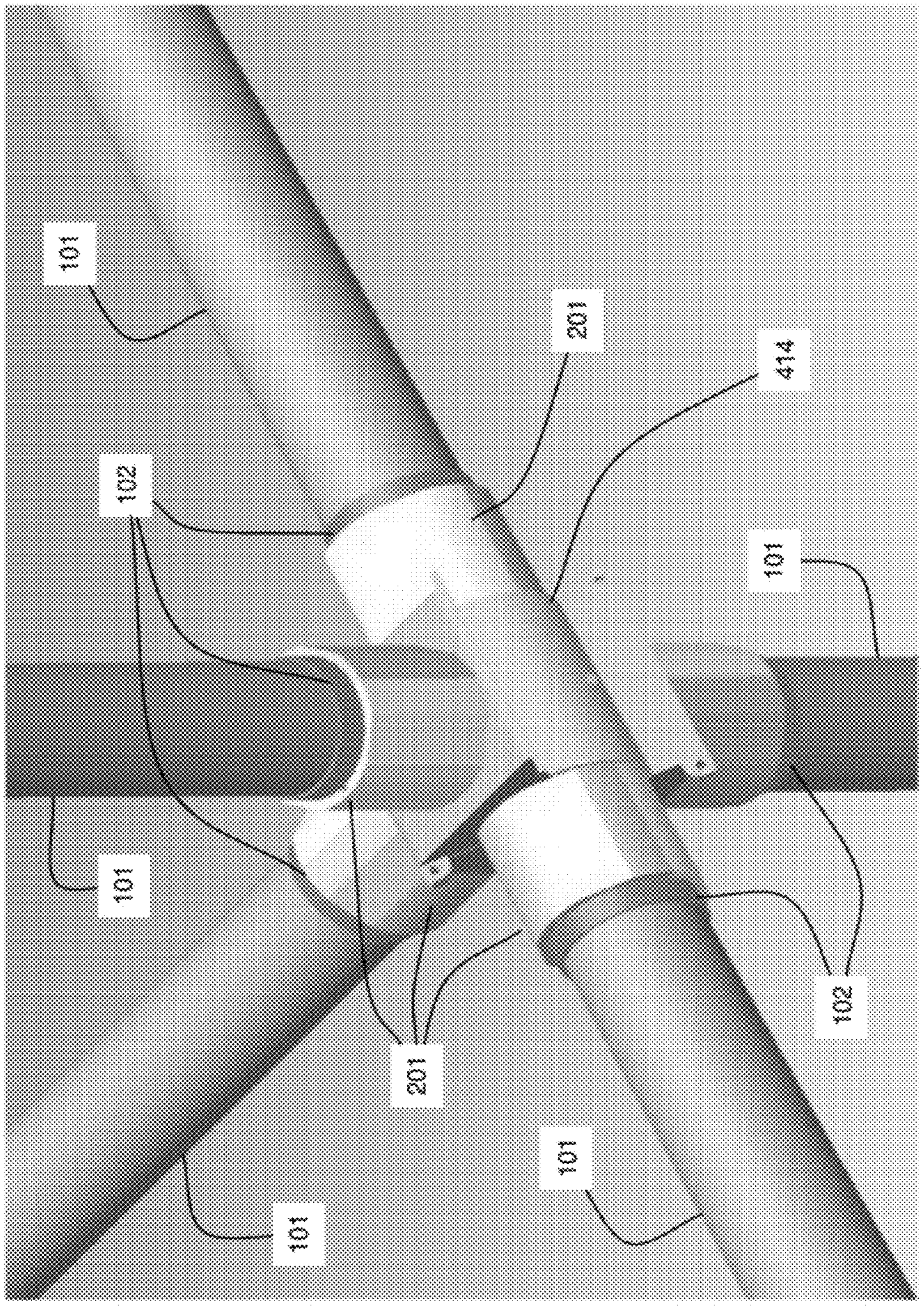
FIG. 6A is an enlarged is an example perspective view of a central region of an illustrative assembled modular LED assembly.

FIG. 6A is an enlarged view of the central region of the illustrative assembled exemplary modular LED assembly 601 (from FIG. 6). Tube sections 101 (from FIG. 1) are preferably connected to the central hub 414 via locking rings 201 (from FIG. 2), which attach to the tube sections 101 via end caps 102 (from FIG. 1B). Alternatively, a clip, pin, fastener or the like (not shown) may be used to connect the tubular light diffusing assembly 101 to central hub 414.

Figure 6B:
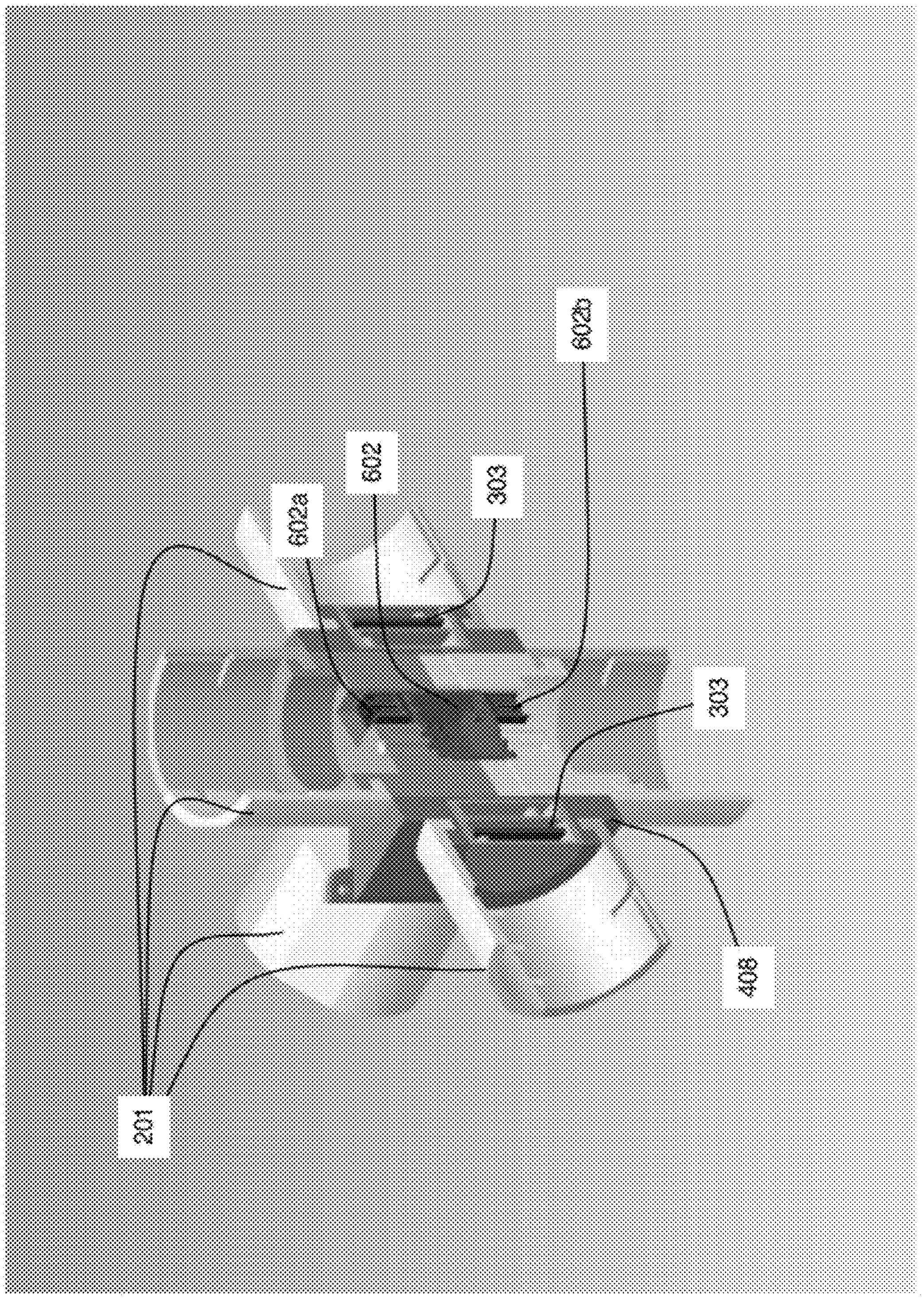
FIG. 6B is a cross section view of the central conical power supply module connected to multiple conical power supply attachments.

FIG. 6B is a cross section view of the central hub 414 (FIG. 6), with respective attachments 408 (from FIG. 4B, 4C). Electrical continuity is provided through central hub 414 via internal electrical coupling 602, which may take the form of wiring, circuitry, or any other suitable electrical connection. Electrical couplers 602*a*, 602*b* are provided for transmission of electrical power and/or data to other components of the modular LED assembly affixed to central hub 414. There is preferably one electrical coupler for each attachment (although only two are shown in FIG. 6). Intermediate connectors 303 (FIGS. 3, 3A) are preferably positioned between central hub 414 and the affixed component of the modular LED assembly to provide electrical continuity between them.

Figure 7:
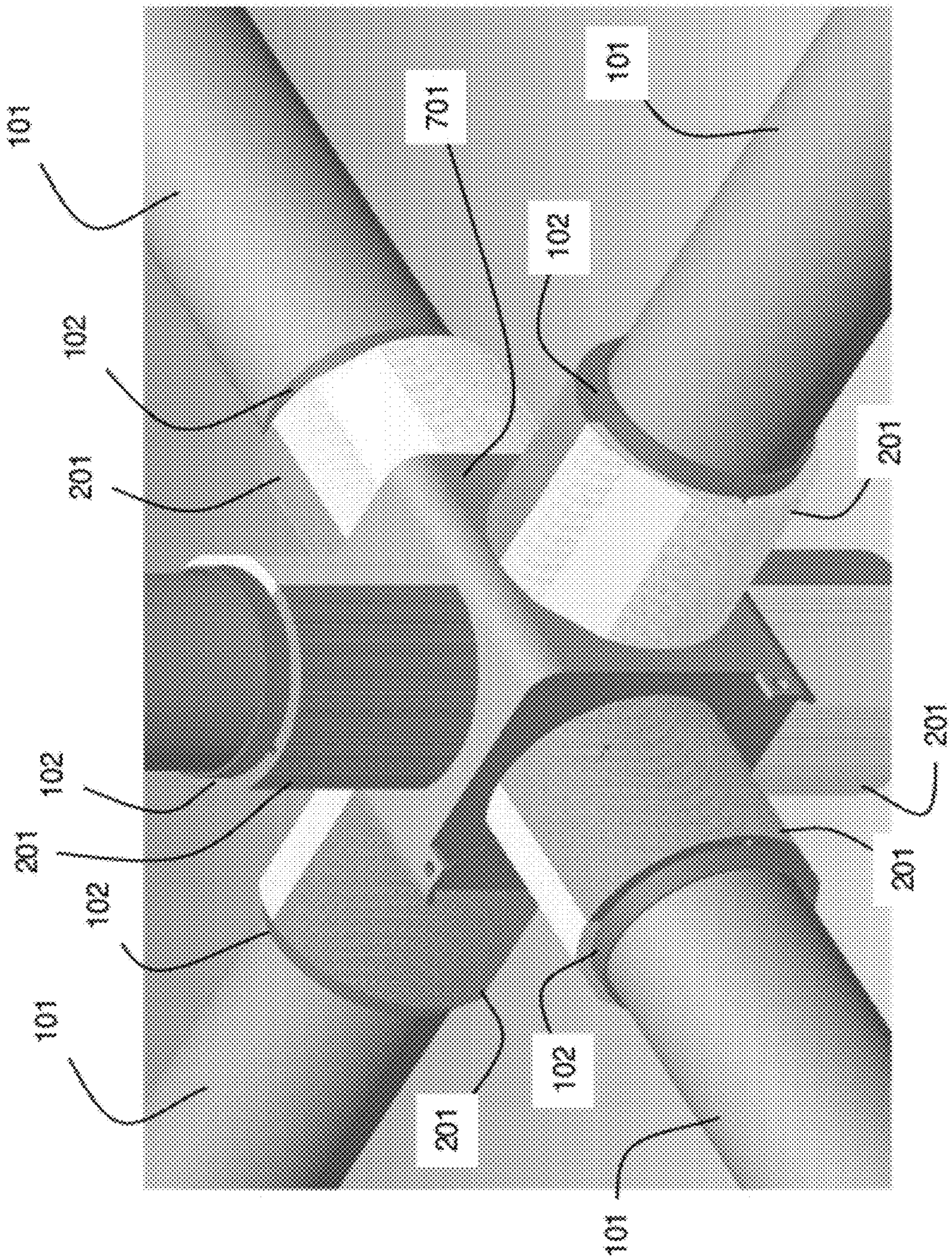
FIG. 7 is an enlarged, partial perspective view of six illustrative, interconnected modular LED assemblies.

FIG. 7 illustrates another illustrative configuration of the modular LED assembly in which six tube sections 101 (with corresponding end caps 102) are releasably connected to one another via a central hub 701. Each tube section 101 is preferably connected to the central hub 701 via a connector or locking ring 201 (from FIG. 2) having an opening for receive the end cap 102. The connector 201 is connected to the central hub 701 and preferably includes one or more recessed internally circumferential grooves (e.g., L-shaped or T-shaped groove) on its inner surface of the opening for releasably engaging a corresponding pin or protrusion 104 projecting from the end cap 102, so that the pin or protrusion 104 may slide into the groove and then twist to releasably lock the end cap 102 to the connector 201. Alternatively, a clip, pin, fastener or the like (not shown) may be used to connect the end cap 102 to the connector 201 or directly to the central hub 701.

Figure 7A:
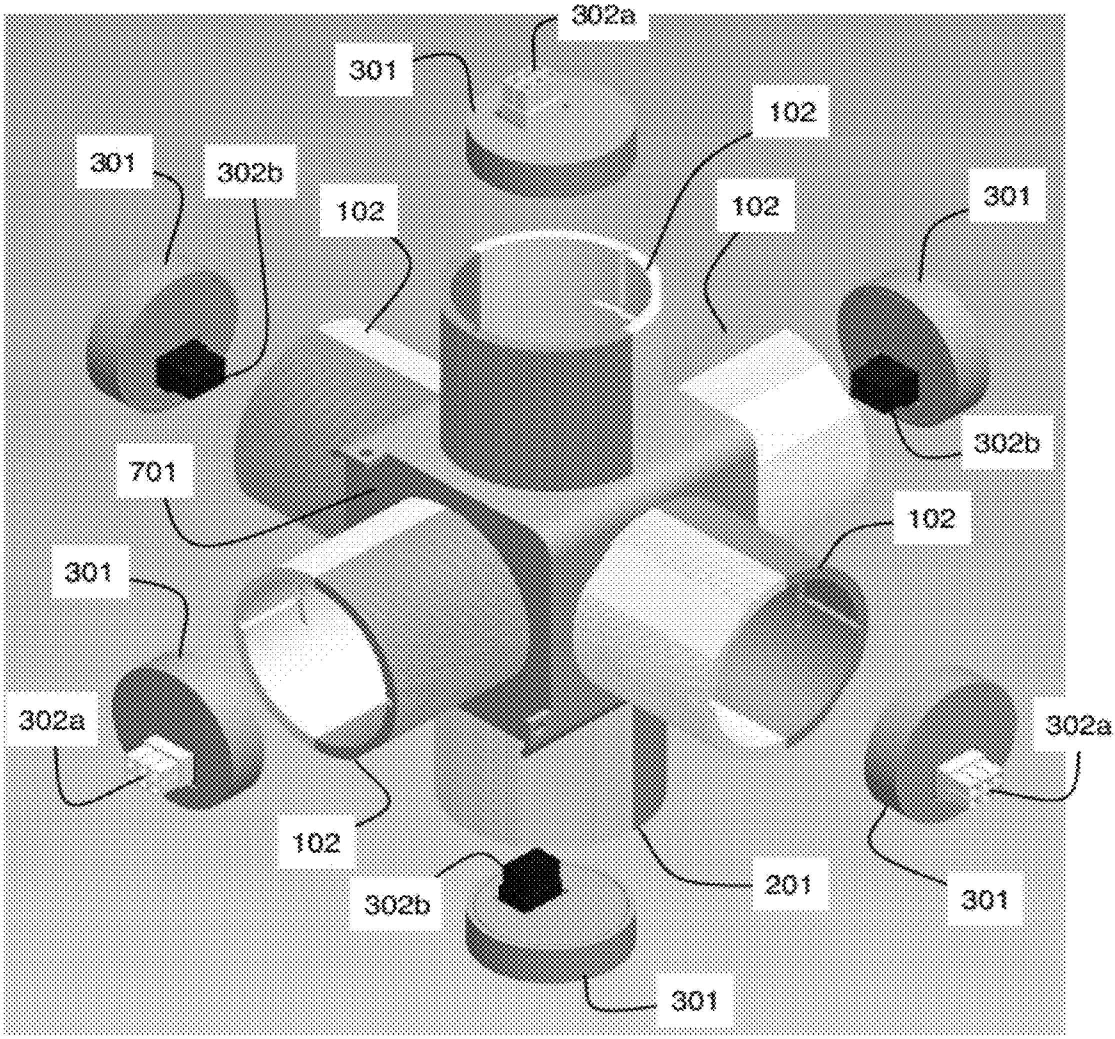
FIG. 7A is an exploded view of a central hub for interconnecting the six illustrative, interconnected modular LED assemblies of FIG. 7.

Referring to FIG. 7A, an intermediate connector 301 is preferably provided within the opening of the connector 201 to electrically connect each light diffusing assembly 101 to the central hub 701. As discussed above, the intermediate connector 301 preferably includes a cylindrically shaped housing having at least two electrical connectors 302*a*, 302*b* protruding from opposing sides of the intermediate connector 301. Electrical connectors 302*a*, 302*b* are preferably electrically coupled via internal electrical junction 303. Internal electrical junction 303 may be wiring, circuitry, or any other suitable connection for communicating electrical power and/or data between connectors 302*a*, 302*b*.

Figure 7B:
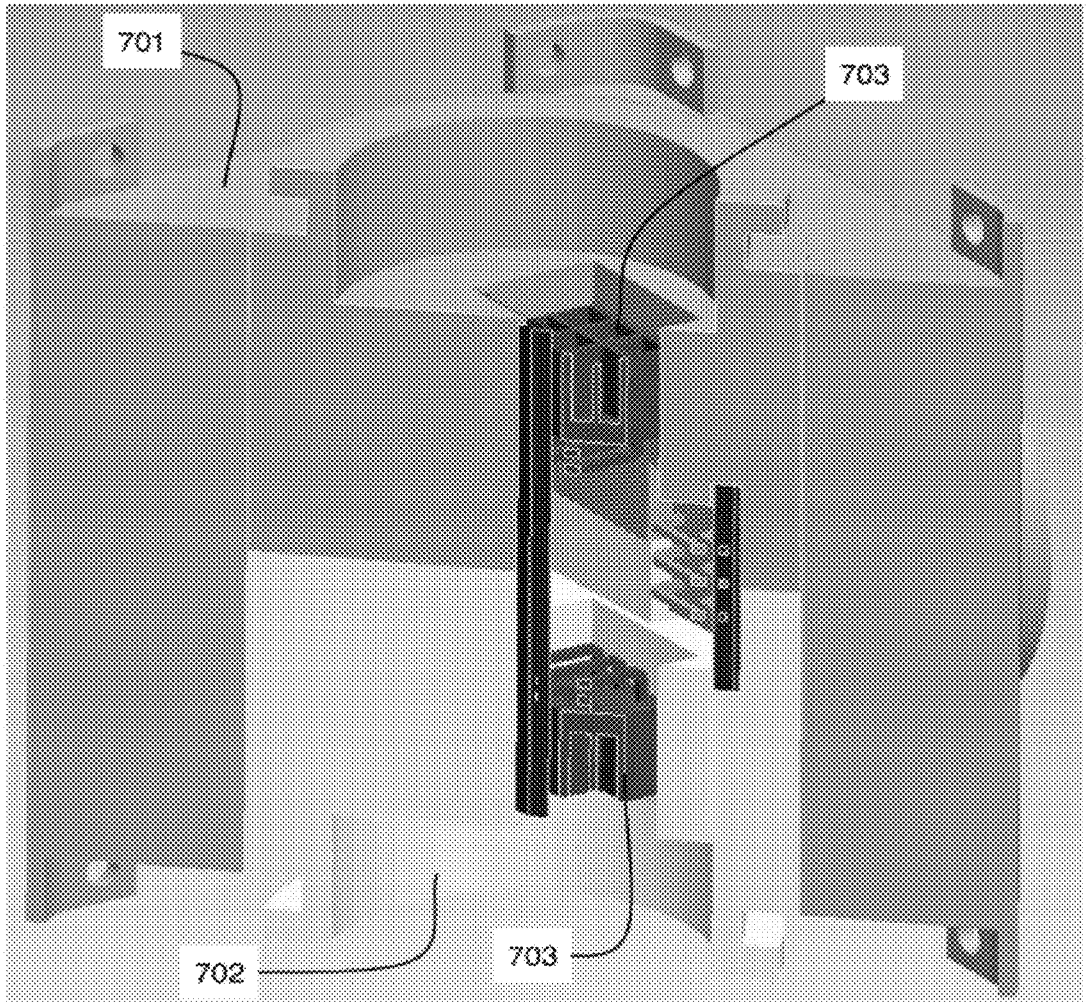
FIG. 7B is a cross section view of the central hub of FIG. 7A.
Figure 7C:
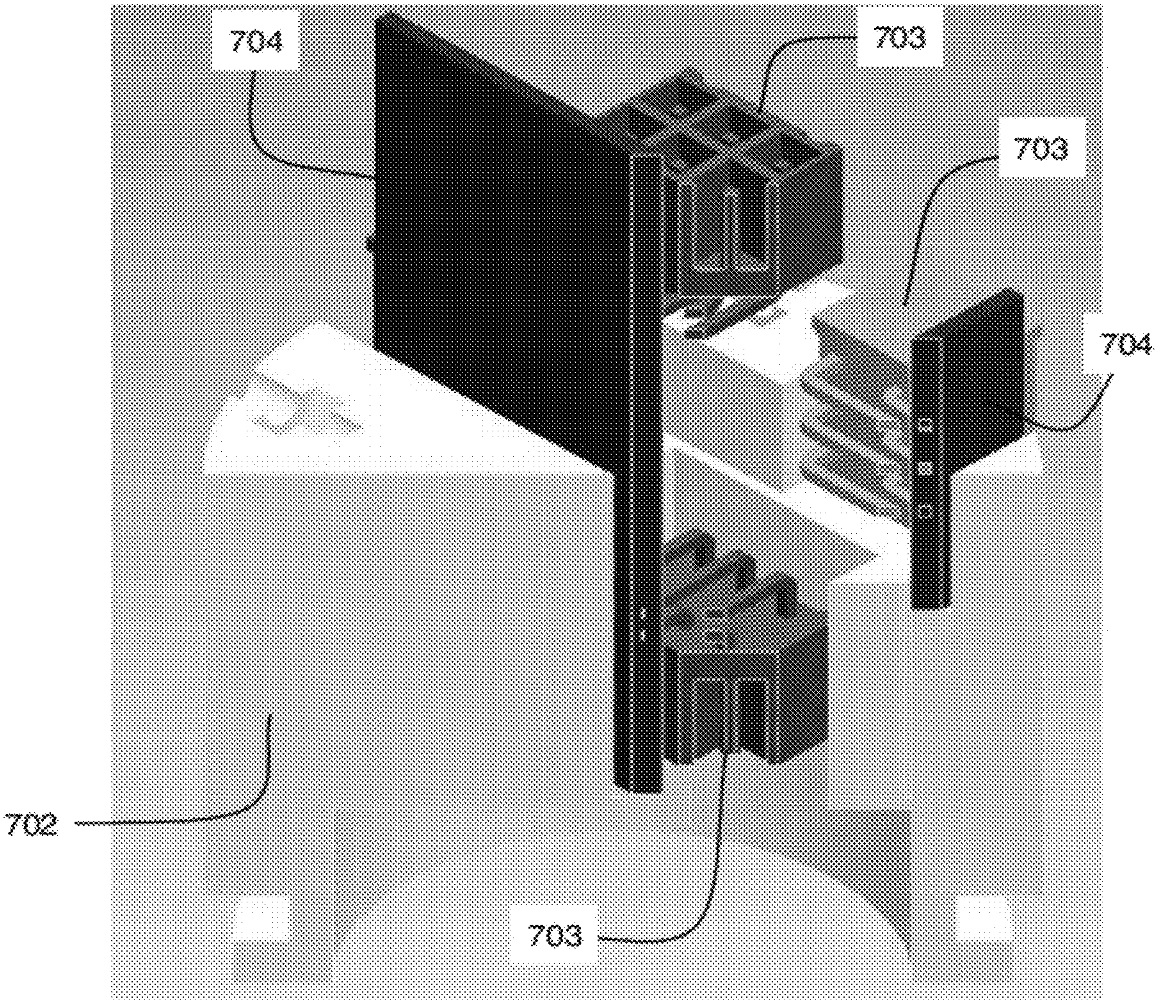
FIG. 7C is a perspective view of an example electrical insert that fits within the central hub of FIG. 7A.

FIG. 7B illustrates a cross section of central hub 701 with an insert 702 for providing an internal electrical connection within the central hub. The insert 702 is shown in FIG. 7C and includes a plurality of electrical connectors 703 for engaging and electrically connecting to a corresponding electrical connector 302 of each intermediate connector 301. Electrical connectors 703 are preferably electrically coupled via internal electrical junction 704. Internal electrical junction 704 may be wiring, circuitry, or any other suitable connection for communicating electrical power and/or data between connectors 703. A power supply 401 may be attached to the central hub 701 or to one of the light diffusing assemblies 101 to provide power and/or data through external power connector 406. Electrical power and/or data are preferably transmitted (via the electrical pathways described above) throughout the entire modular LED assembly, illuminating the LEDs within each light diffusing assembly 101. In this manner, the central hub 701 preferably includes one power/data integrated connection for multiple light diffusing assemblies 101.

Figure 8:
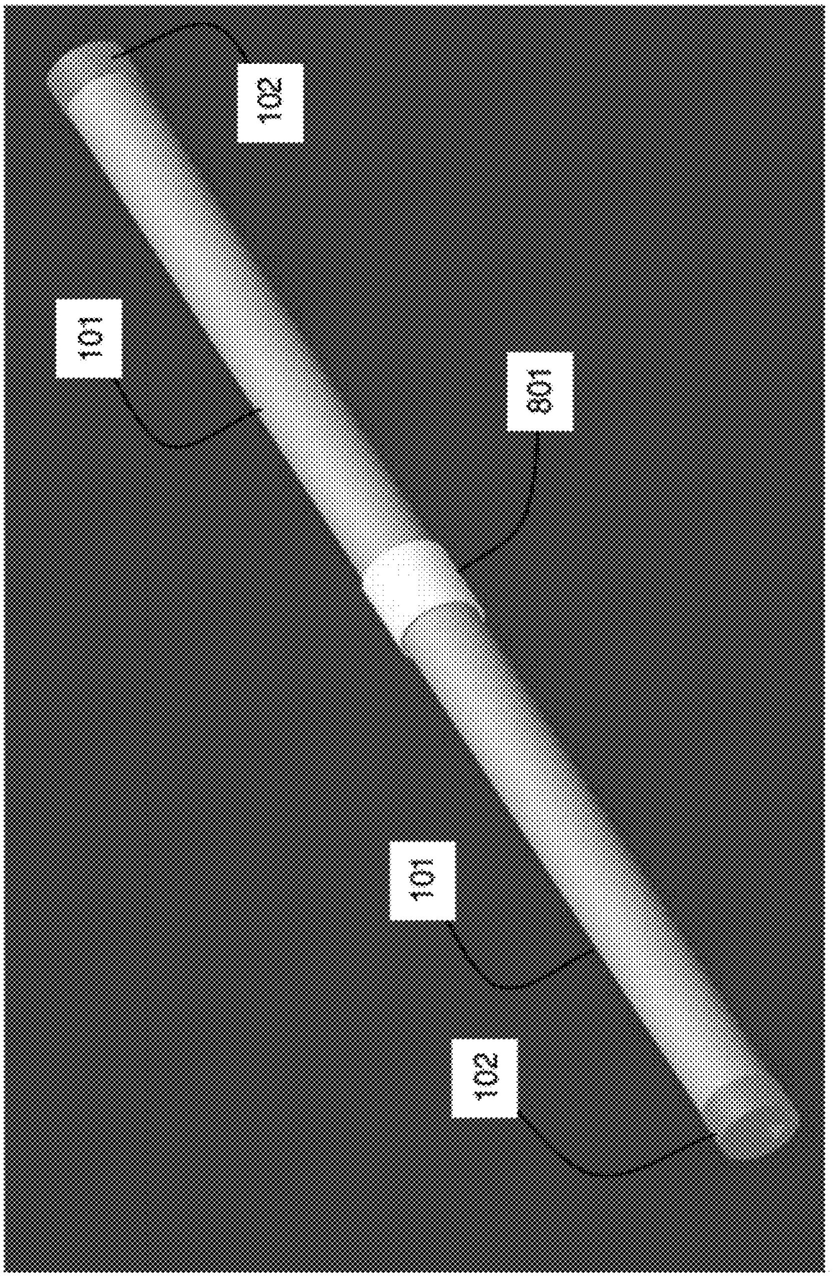
FIG. 8 is a perspective view of two illustrative, interconnected modular LED assemblies.

FIG. 8 illustrates another illustrative configuration of the modular LED assembly in which two tube sections 101 (with corresponding end caps 102) are releasably, linearly (i.e. at an angle of 180°) connected to one another via a central connector 801. The central connector 801 is preferably cylindrical shaped and includes an openings for receiving an end cap 102 from tube section 101. An electrical connector is preferably mounted in the opening of the central connector to engage and electrically connect to the corresponding electrical connector 108 (FIG. 1C) located within the end cap 102. The electrical connectors within the central connector 801 are preferably electrically connected to one another so that electrical power and/or data is preferably transmitted (via the electrical pathways described above) throughout the entire modular LED assembly, illuminating the LEDs within each light diffusing assembly 101. Like the locking ring 201, the central connector 801 preferably includes one or more recessed internally circumferential grooves (e.g., L-shaped or T-shaped groove) on its inner surface for releasably engaging a corresponding pin or protrusion 104 projecting from the end cap 102, so that the pin or protrusion 104 may slide into the groove and then twist to releasably lock the end cap 102 to the central connector 801. Alternatively, a clip, pin, fastener or the like (not shown) may be used to connect the end cap 102 to the central connector 801.

Figure 9:
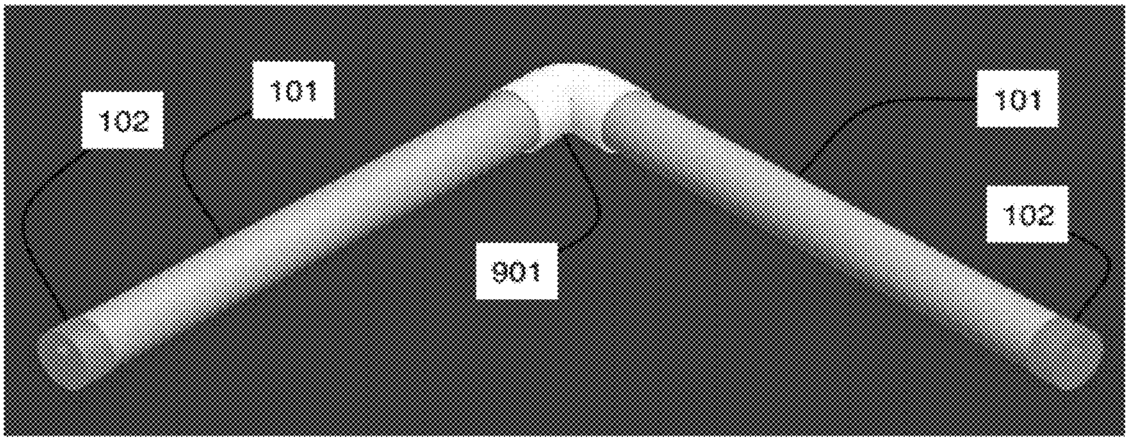
FIG. 9 is a perspective view of two illustrative modular LED assemblies interconnected at approximately 90° to one another.
Figure 9A:
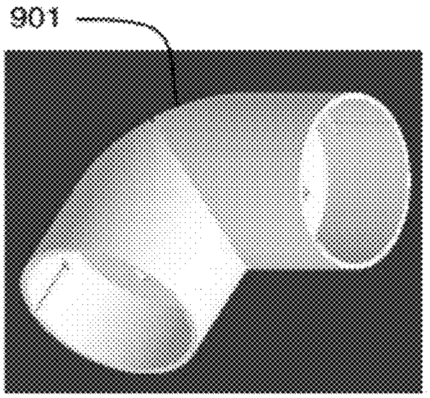
FIG. 9A is a perspective view of a 90° intermediate connector connecting the two illustrative modular LED assemblies of FIG. 9.

FIGS. 9 and 9A illustrate another illustrative configuration of the modular LED assembly in which two tube sections 101 (with corresponding end caps 102) are releasably connected at an angle which, as shown, is approximately 90° to one another via a 90° connector (e.g., elbow) 901. The connector 901 preferably includes a pair of openings for receiving an end cap 102 from the tube sections 101. An electrical connector is preferably mounted in each opening of the central connector to engage and electrically connect to the corresponding electrical connector 108 (FIG. 1C) located within the end cap 102. The electrical connectors within the connector 901 are preferably electrically connected to one another so that electrical power and/or data is preferably transmitted (via the electrical pathways described above) throughout the entire modular LED assembly, illuminating the LEDs within each light diffusing assembly 101. Like the locking ring 201, the connector 901 preferably includes one or more recessed internally circumferential grooves (e.g., L-shaped or T-shaped groove) on its inner surface for releasably engaging a corresponding pin or protrusion 104 projecting from the end cap 102, so that the pin or protrusion 104 may slide into the groove and then twist to releasably lock the end cap 102 to the connector 901. Alternatively, a clip, pin, fastener or the like (not shown) may be used to connect the end cap 102 to the connector 901.

Figure 10A:
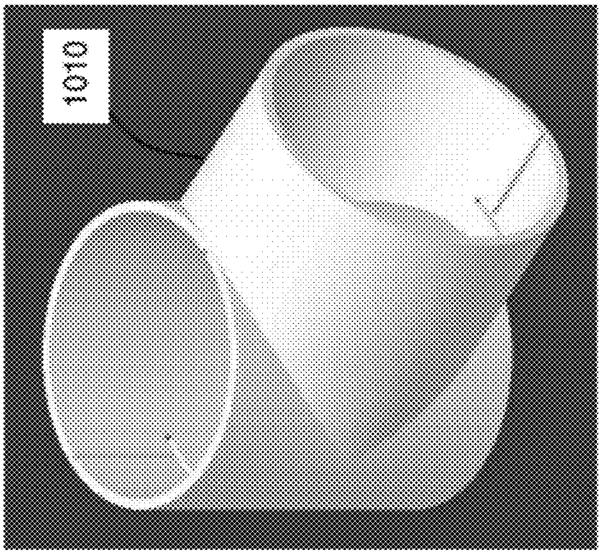
FIG. 10A is a perspective view of an example intermediate connector connecting the three illustrative modular LED assemblies of FIG. 10.
Figure 10:
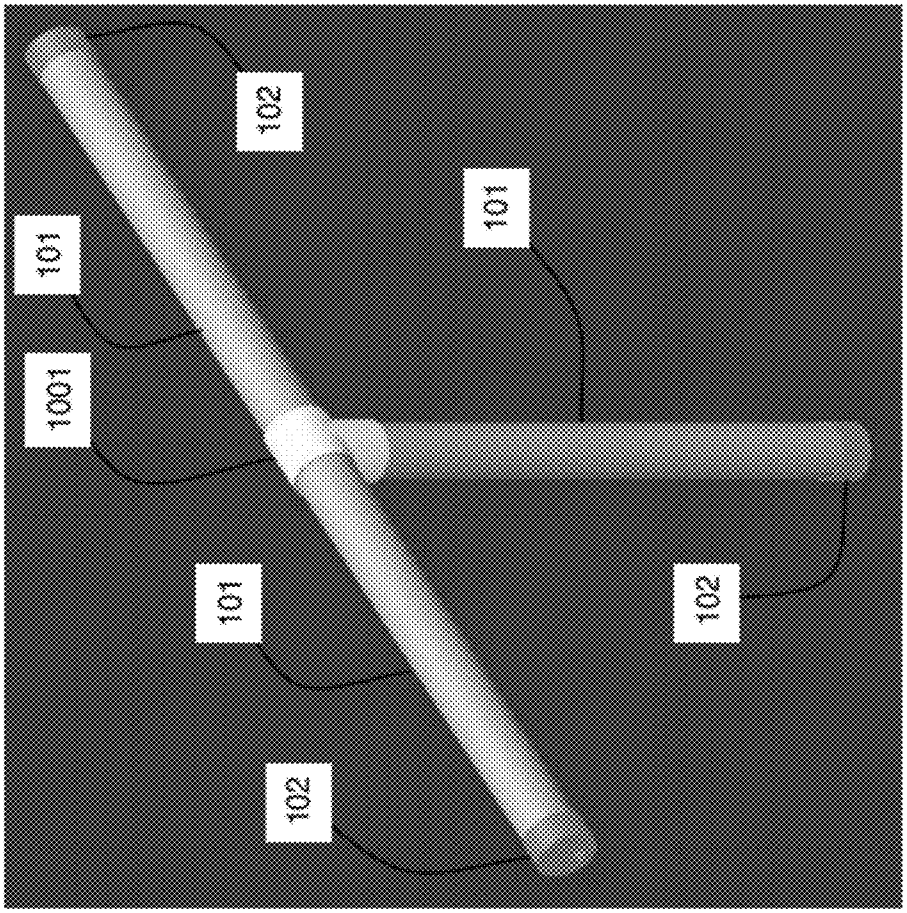
FIG. 10 is a perspective view of three illustrative interconnected modular LED assemblies.

FIGS. 10 and 10A illustrate another illustrative configuration of the modular LED assembly in which three tube sections 101 (with corresponding end caps 102) are releasably connected to one another via a three-way connector 1001. The connector 1001 preferably includes openings for receiving an end cap 102 from each tube section 101. An electrical connector is preferably mounted in each opening of the connector 1001 to engage and electrically connect to the corresponding electrical connector 108 (FIG. 1C) located within the end cap 102. The electrical connectors within the connector 1001 are preferably electrically connected to one another so that electrical power and/or data is preferably transmitted (via the electrical pathways described above) throughout the entire modular LED assembly, illuminating the LEDs within each light diffusing assembly 101. Like the locking ring 201, the connector 1001 preferably includes one or more recessed internally circumferential grooves (e.g., L-shaped or T-shaped groove) on its inner surface for releasably engaging a corresponding pin or protrusion 104 projecting from the end cap 102, so that the pin or protrusion 104 may slide into the groove and then twist to releasably lock the end cap 102 to the connector 1001. Alternatively, a clip, pin, fastener or the like (not shown) may be used to connect the end cap 102 to the connector 1001.

Figure 11:
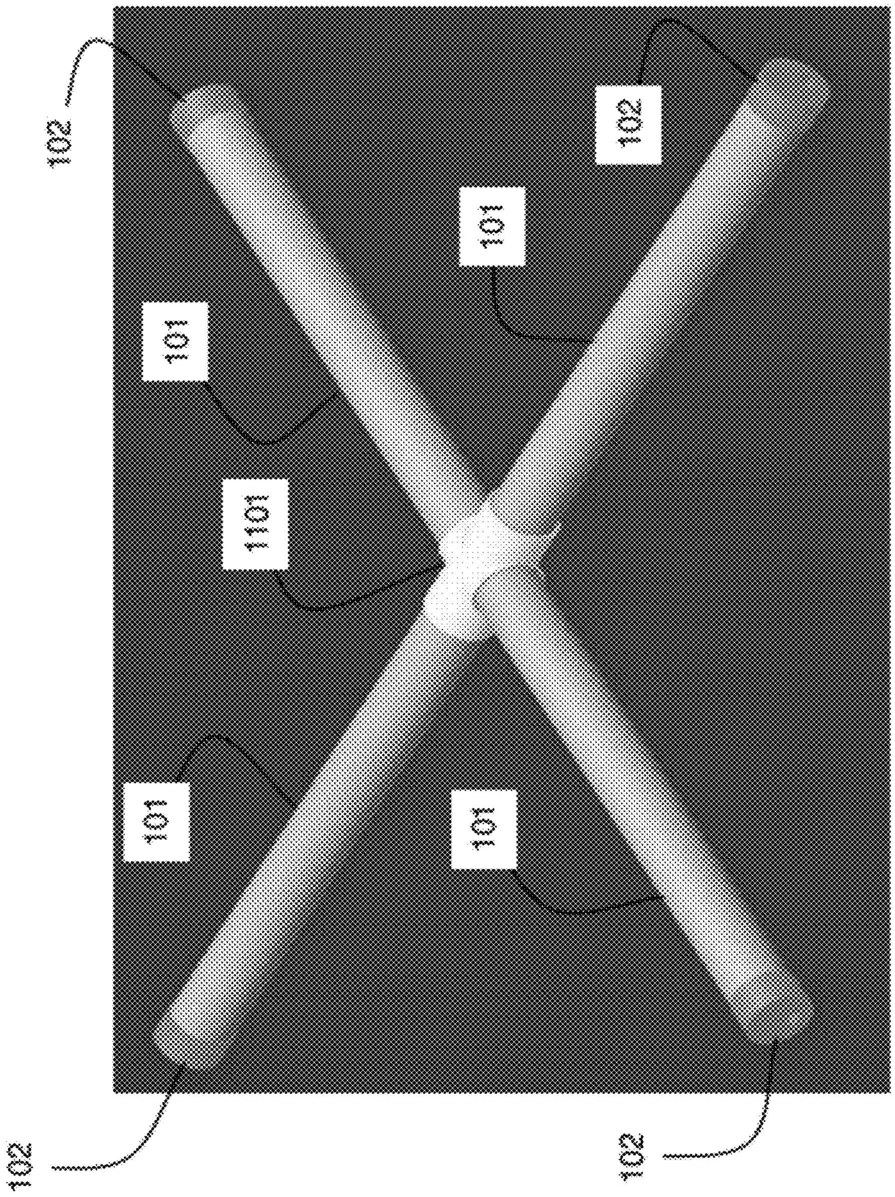
FIG. 11 is a perspective view of four illustrative interconnected modular LED assemblies.

FIG. 11 illustrates another illustrative configuration of the modular LED assembly in which four tube sections 101 (with corresponding end caps 102) are releasably connected to one another via a four-way connector 1101. The connector 1001 preferably includes openings for receiving the end cap 102 from the tube sections 101. An electrical connector is preferably mounted in each opening of the connector 1101 to engage and electrically connect to the corresponding electrical connector 108 (FIG. 1C) located within the end cap 102. The electrical connectors within the connector 1101 are preferably electrically connected to one another so that electrical power and/or data is preferably transmitted (via the electrical pathways described above) throughout the entire modular LED assembly, illuminating the LEDs within each light diffusing assembly 101. Like the locking ring 201, the connector 1001 preferably includes one or more recessed internally circumferential grooves (e.g., L-shaped or T-shaped groove) on its inner surface for releasably engaging a corresponding pin or protrusion 104 projecting from the end cap 102, so that the pin or protrusion 104 may slide into the groove and then twist to releasably lock the end cap 102 to the connector 1101. Alternatively, a clip, pin, fastener or the like (not shown) may be used to connect the end cap 102 to the connector 1101.

By a combination of some or all of the above-described modular LED assembly components, a wide variety of shapes and configurations may be created. For instance, if one wished to use the system to decorate the entrance to a social venue, a modular LED assembly may be configured in the shape of an arch or a doorway to frame the entrance. Alternatively, if one wished to decorate the ceiling of a large hall, stars and other desired shape configurations of modular LED assemblies may be formed, using different angled connectors and can be suspended from the ceiling.

It should be understood that the components disclosed herein might be altered in design or shape to suit the needs of the end user. For instance, the tubular light diffusing assembly may be curved instead of straight as depicted in FIG. 1. This would enable a user to create circular or rounded shapes as well. Alternatively, the interlocking components between the tubular light diffusing assemblies may be curved as well, enabling a user to lock components together at different angles.

The modular LED assemblies described herein may utilize one or more hub assemblies or connectors having one power/data integrated connection with multiple ports for interconnected light diffusing assemblies.

In addition, the end caps 102 on each light diffusing assembly 100 may be wired or strung together to provide an electrical connection for the distribution of power and/or data to a multiplicity of tubular light diffusing assemblies with all wiring being readily concealed, even in cases where the tubular light diffusing assemblies are deployed vertically (such as (but not limited to)) lining a runway, stairs or the like). Similarly, an end cap on the tubular light diffusing assembly may be recessed within a structure or surface (such as (but not limited to) a stage, wall, display case, or any other structure or architectural application) where concealed wiring is desired. In this manner, the recessed end caps of tubular light diffusing assemblies may be wired or strung together through the opposing or non-viewable side of the structure or surface to conceal the wiring. In this manner, custom artistic creations of tubular light diffusing assemblies may be created, such as, for example, recessing thirty light diffusing assemblies into a globe using shallow angles between the tubular light diffusing assemblies to create a "sea urchin"-like concept or recessing seven light diffusing assemblies into a small half circle table mount to create a custom centerpiece for a special event.

The independent units may also be controllable as well, to enable variation of the lighting display. For instance, the tubular light diffusing assemblies may be coordinated to blink on and off in a pattern, creating an illusion that light is traveling through the assembly. The control communication mechanism is preferably a wireless mechanism, such as a wireless data interface. Alternatively, it may be a wired electrical connection as well, preferably built into the power and/or data delivery mechanism. The lights may be controlled via a dedicated console or other similar hardware. Alternatively, a computer with a software program may control them.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A reconfigurable modular lighting assembly, comprising:

at least two tube sections each having an end cap thereon, the tube sections each comprising at least one light emitting diode light source;

an interconnection unit comprising a plurality of tube section receiving locations that each i) physically, releasably connect one end of a first of the at least two tube sections to one end of a second of the at least two tube sections such that the at least two tube sections are adjacent to each other and form a positive angle between them; and ii) provide for interchangeably electrically connecting the light emitting diode light sources in the at least two tube sections to a source of electrical power; and control data paths operatively connected to each of the light emitting diode light sources via the interconnection unit and configured to allow for control of the light emitting diode light sources when the at least two tube sections are respectively connected to the interconnection unit at the tube section receiving locations.

2. The reconfigurable modular lighting assembly of claim 1, wherein the tube sections are straight.

3. The reconfigurable modular lighting assembly of claim 1, wherein the tube sections are curved.

4. The reconfigurable modular lighting assembly of claim 1, wherein the at least one light emitting diode light source comprises at least one of:

inorganic LEDs, organic LEDs, polymer LEDs (PLEDs), flexible LEDs (FLEDs), phosphor-based LEDs or quantum dot LEDs.

5. The reconfigurable modular lighting assembly of claim 1, wherein the positive angle is approximately 90°.

6. The reconfigurable modular lighting assembly of claim 1, wherein the positive angle is approximately 180°.

7. The reconfigurable modular lighting assembly of claim 1, wherein the interconnection unit comprises exactly two tube section receiving locations.

8. The reconfigurable modular lighting assembly of claim 7, wherein the exactly two tube section receiving locations maintain two tube sections at the positive angle of approximately 90° relative to each other.

9. The reconfigurable modular lighting assembly of claim 1, wherein the interconnection unit comprises exactly three tube section receiving locations.

10. The reconfigurable modular lighting assembly of claim 9, wherein the exactly three tube section receiving locations maintain three tube sections at the positive angle of approximately 90° relative to each other.

11. The reconfigurable modular lighting assembly of claim 9, wherein the exactly three tube section receiving locations maintain three tube sections in a "T" shaped configuration.

12. The reconfigurable modular lighting assembly of claim 1, wherein the interconnection unit comprises at least four tube section receiving locations.

13. The reconfigurable modular lighting assembly of claim 12, wherein the at least four tube section receiving locations comprise at least five tube section receiving locations.

14. The reconfigurable modular lighting assembly of claim 12, wherein the at least four tube section receiving locations will maintain tube sections in one of:

a "sea urchin"-like configuration, or an "X" configuration.

15. The reconfigurable modular lighting assembly of claim 12, wherein the at least two tube sections comprise a multiplicity of tube sections, the reconfigurable modular lighting assembly further comprising:

multiple interconnection units arranged to configure the multiplicity of tube sections into a compound shape.

16. The reconfigurable modular lighting assembly of claim 1, further comprising an intermediate connector physically disposed between one tube section and a tube section receiving location.

17. The reconfigurable modular lighting assembly of claim 16, wherein the multiple tube section receiving locations are identical and the intermediate connector comprises a standardizing connector configured for mating with an accommodating connector of the tube section receiving location so as to allow the one tube section to be interchangeably connected to any of the multiple tube section receiving locations.

18. A modular light emitting diode assembly system, comprising:

a hub comprising at least three assembly connectors thereon, each of the at least three assembly connectors being capable of supplying electrical power to a light diffusing assembly connected thereto via a power connection;

first and second tubular light diffusing assemblies, each light-diffusing assembly including:

i) a tube section having at least one light emitting diode mounted within the tube section, ii) an electrical connector electrically connected to the at least one internally mounted light emitting diode, and iii) an end cap mounted on an end of the tube section, the end cap including a port configured to receive the electrical connector connected to the at least one light emitting diode; and intermediate connectors, each releasably connected to the end cap of one of the first and second tubular light diffusing assemblies and configured to matingly standardize the electrical connector of the respective end cap mounted on the end of the tube section to all of the power connections of the hub; and wherein the hub is configured to concurrently receive an end of each of both the first tubular light diffusing assembly and the second tubular light diffusing assembly and maintain the first and second tubular light diffusing assemblies at a positive angle relative to each other.

19. The modular light emitting diode system of claim 18, further comprising a power supply assembly releasably connected to at least one light diffusing assembly, the power supply assembly having a first electrical connector electrically connected to an external power source and a second electrical connector electrically connected to the first light diffusing assembly via the intermediate connector and end cap.

20. The modular light emitting diode system of claim 18, further comprising a base that includes an upwardly projecting cylindrical portion releasably connected to the power supply assembly.

21. The modular light emitting diode system of claim 18, wherein the at least one internally mounted light emitting diode comprises at least one of:

an inorganic LED, an organic LED, a polymer LED (PLED), a flexible LED (FLED), a phosphor-based LED or a quantum dot LED.

22. An interconnection unit for use in a reconfigurable modular lighting assembly comprising:

a plurality of tube section receiving locations that each are configured to receive a tube section having multiple light emitting diode light sources therewithin;

each tube section receiving location being configured to releasably i) provide a power and a data connection to one end of a received tube section, ii) constrain the received tube section in place when connected thereto;

wherein the tube section receiving locations are offset at a positive angle relative to each other such that, when two tube sections are releasably connected to different, adjacent tube section receiving locations, the two tube sections will be at the positive angle.

23. The interconnection unit of claim 22, further comprising:

an intermediate connector configured to adapt a specific tube section having a first style of power and data connection in a first configuration to the power and data connections within the tube section receiving locations when the first configuration does not matingly correspond to a configuration of the power and data connections of the tube section receiving locations.

24. The interconnection unit of claim 22, wherein the positive angle is approximately 90°.

25. The interconnection unit of claim 22, wherein the positive angle is approximately 180°.

26. The interconnection unit of claim 22, wherein the multiple tube section receiving locations comprise at least four tube section receiving locations, each offset from the others by at least approximately 90°.

* * * * *